US012106101B2

(12) United States Patent
Azadet et al.

(10) Patent No.: US 12,106,101 B2
(45) Date of Patent: Oct. 1, 2024

(54) VECTOR PROCESSOR SUPPORTING LINEAR INTERPOLATION ON MULTIPLE DIMENSIONS

(71) Applicant: Intel Corporation, Santa Clara, CA (US)

(72) Inventors: Kameran Azadet, San Ramon, CA (US); Joseph Williams, Holmdel, NJ (US); Zoran Zivkovic, Hertogenbosch (NL)

(73) Assignee: Intel Corporation, Santa Clara, CA (US)

( * ) Notice: Subject to any disclaimer, the term of this patent is extended or adjusted under 35 U.S.C. 154(b) by 768 days.

(21) Appl. No.: 17/131,939

(22) Filed: Dec. 23, 2020

(65) Prior Publication Data
US 2022/0197640 A1    Jun. 23, 2022

(51) Int. Cl.
| | |
|---|---|
| *G06F 9/30* | (2018.01) |
| *G06F 9/38* | (2018.01) |
| *G06F 16/901* | (2019.01) |

(52) U.S. Cl.
CPC ........ *G06F 9/30036* (2013.01); *G06F 9/3812* (2013.01); *G06F 9/3873* (2013.01); *G06F 16/9017* (2019.01)

(58) Field of Classification Search
CPC .................................................. G06F 9/30036
See application file for complete search history.

(56) References Cited

U.S. PATENT DOCUMENTS

| | | | |
|---|---|---|---|
| 5,025,784 A * | 6/1991 | Shao | A61B 5/0809 600/513 |
| 8,896,471 B1 | 11/2014 | Pagnanelli | |
| 9,069,685 B2 | 6/2015 | Azadet | |
| 9,191,041 B2 * | 11/2015 | Mkadem | H04B 1/0475 |
| 9,225,501 B2 | 12/2015 | Azadet | |
| 9,363,068 B2 | 6/2016 | Azadet et al. | |
| 9,778,902 B2 | 10/2017 | Azadet et al. | |
| 9,813,223 B2 | 11/2017 | Azadet | |

(Continued)

FOREIGN PATENT DOCUMENTS

WO    2013063443 A1    5/2013

OTHER PUBLICATIONS

Search Report dated Dec. 17, 2021 for International Application No. PCT/US21/50185.

(Continued)

*Primary Examiner* — Jacob Petranek
(74) *Attorney, Agent, or Firm* — Banner & Witcoff Ltd.

(57) ABSTRACT

Techniques are disclosed for a vector processor architecture that enables data interpolation in accordance with multiple dimensions, such as one-, two-, and three-dimensional linear interpolation. The vector processor architecture includes a vector processor and accompanying vector addressable memory that enable a simultaneous retrieval of multiple entries in the vector addressable memory to facilitate linear interpolation calculations. The vector processor architecture vastly increases the speed in which such calculations may occur compared to conventional processing architectures. Example implementations include the calculation of digital pre-distortion (DPD) coefficients for use with radio frequency (RF) transmitter chains to support multi-band applications.

24 Claims, 10 Drawing Sheets

(56) References Cited

U.S. PATENT DOCUMENTS

| | | | |
|---|---|---|---|
| 9,923,595 | B2 | 3/2018 | Molina et al. |
| 9,960,900 | B2* | 5/2018 | Azadet .................. H04L 27/367 |
| 2004/0223636 | A1 | 11/2004 | Edic et al. |
| 2005/0240644 | A1 | 10/2005 | Van Berkel et al. |
| 2008/0112647 | A1* | 5/2008 | Chu ...................... G06T 3/4007 |
| | | | 382/298 |
| 2014/0314176 | A1 | 10/2014 | Azadet |
| 2015/0187129 | A1 | 7/2015 | Sloan |
| 2020/0314289 | A1* | 10/2020 | Wu .......................... H04N 9/69 |
| 2022/0076107 | A1* | 3/2022 | Li .......................... G06N 3/063 |

OTHER PUBLICATIONS

Molina, et al., "Digital Predistortion Using Lookup Tables With Linear Interpolation and Extrapolation: Direct Least Squares Coefficient Adaptation", IEEE Transactions on Microwave Theory and Techniques, vol. 65, No. 3, 8 pgs., Mar. 2017.

Molina, et al., "Concurrent Dual-Band Digital Predistortion Using 2-D Lookup Tables with Bilinear Interpolation and Extrapolation: Direct Least Squares Coefficient Adaptation", IEEE Transactions on Microwave Theory and Techniques, vol. 65, No. 4, 13 pgs., Apr. 2017.

* cited by examiner

VECTOR PROCESSOR SUPPORTING LINEAR INTERPOLATION ON MULTIPLE DIMENSIONS

TECHNICAL FIELD

Aspects described herein generally relate to vector processors and vector addressable memory architectures and, in particular, to techniques for using such architectures to perform linear interpolation in multiple dimensions.

BACKGROUND

Certain applications, such as wireless communications for example, implement data processing that requires the evaluation of a data function in accordance with a data sample value. In other words, such applications may use a data sample 'x' as a data input and then evaluate f(x) for that particular sample. To conserve memory, this is typically done by referencing a lookup table (LUT) having several entries that contain data outputs for f(x) corresponding to a coarse subset of expected data sample input values, and performing linear interpolation between the LUT entries to calculate values for f(x) for data input sample values x that fall between adjacent table entries. Current techniques to do so, however, have various drawbacks, particularly with respect to the speed at which such linear interpolation calculations may be performed.

BRIEF DESCRIPTION OF THE DRAWINGS/FIGURES

The accompanying drawings, which are incorporated herein and form a part of the specification, illustrate the aspects of the present disclosure and, together with the description, and further serve to explain the principles of the aspects and to enable a person skilled in the pertinent art to make and use the aspects.

The exemplary aspects of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Introduction to Vector Processor Operation

Generally speaking, conventional CPUs manipulate one or two pieces of data at a time. For instance, conventional CPUs may receive an instruction that essentially says "add A to B and put the result in C," with 'C' being an address in memory. Typically the data is rarely sent in raw form, and is instead "pointed to" via passing an address to a memory location that holds the actual data. Decoding this address and retrieving the data from that particular memory location takes some time, during which a conventional CPU sits idle waiting for the requested data to be retrieved. As CPU speeds have increased, this memory latency has historically become a large impediment to performance. Thus, to reduce the amount of time consumed by these steps, most modern CPUs use a technique known as instruction pipelining in which the instructions sequentially pass through several sub-units. The first sub-unit reads and decodes the address, the next sub-unit "fetches" the values at those addresses, while the next sub-unit performs the actual mathematical operations.

Vector processors, which are otherwise known as array processors, take this concept even further. For instance, instead of pipelining just the instructions, vector processors also pipeline the data itself. For example, a vector processor may be fed instructions that indicate not to merely add A to B, but to add all numbers within a specified range of address locations in memory to all of the numbers at another set of address locations in memory. Thus, instead of constantly decoding the instructions and fetching the data needed to complete each one, a vector processor may read a single instruction from memory. This initial instruction is defined in a manner such that the instruction itself indicates that the instruction will repeatedly be executed on another item of data, at an address one increment larger than the last. This allows for significant savings in decoding time.

Figure 1:
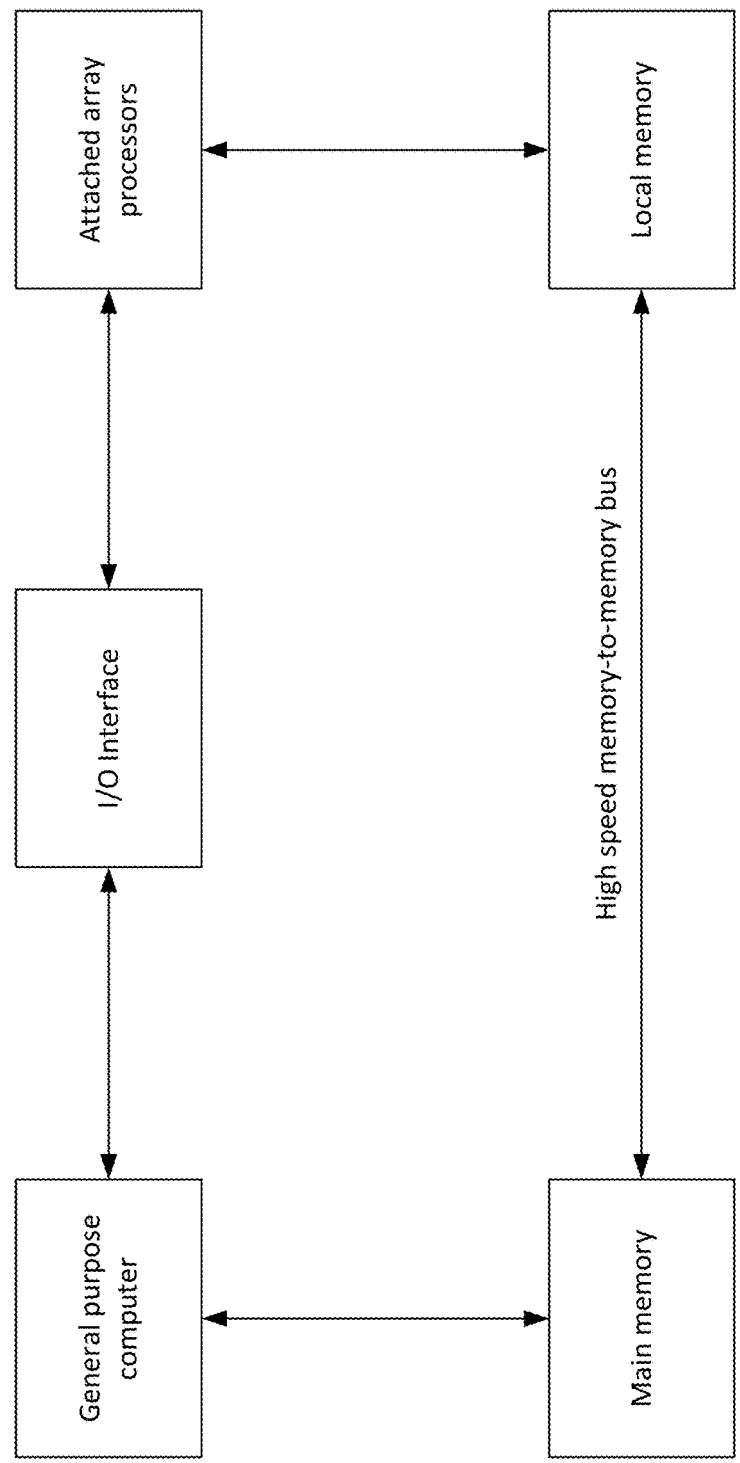
FIG. 1 illustrates an example of a conventional vector processor architecture.
Figure 2:
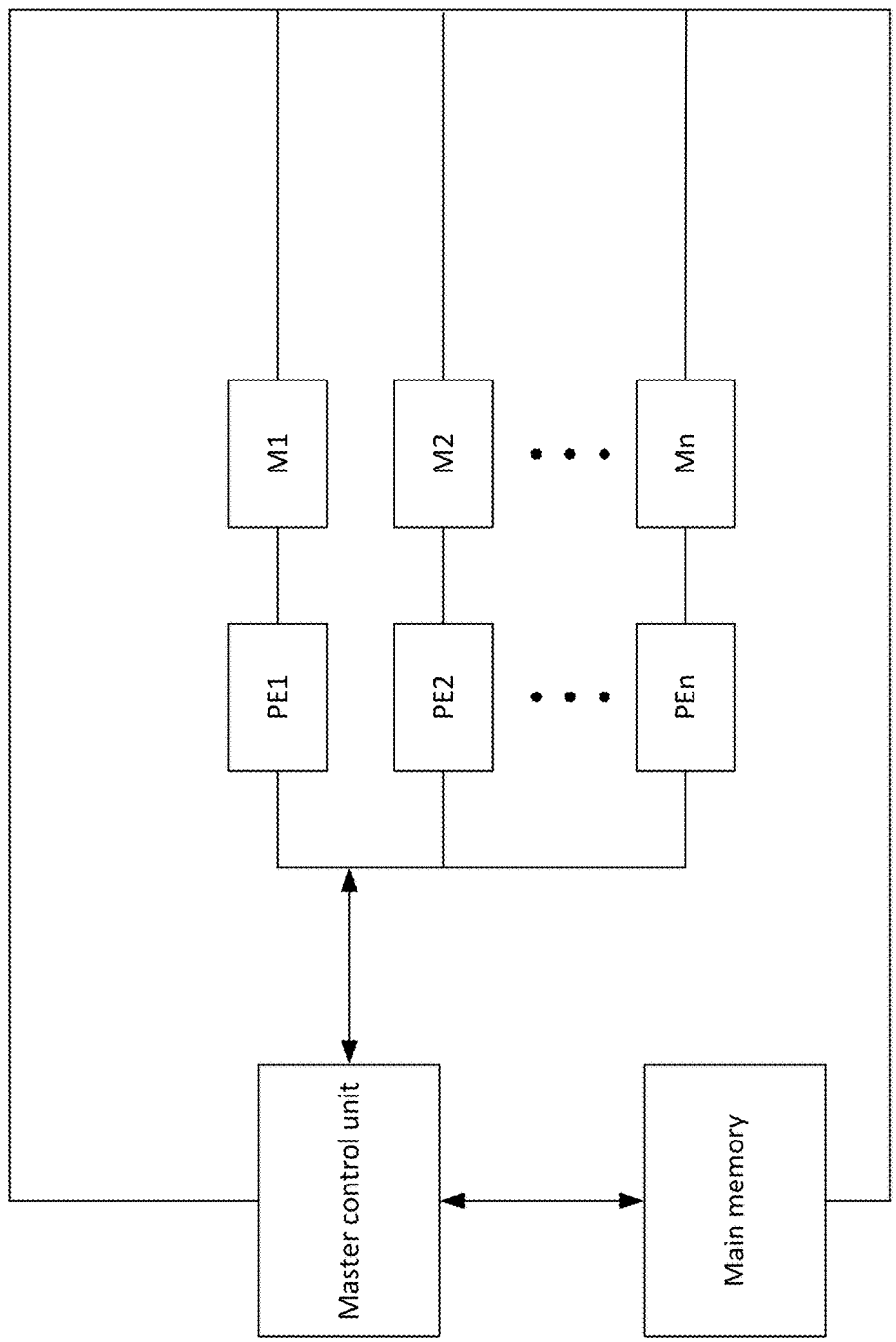
FIG. 2 illustrates another example of a conventional vector processor architecture.

Vector processors may be implemented in accordance with various architectures, and the aspects as further described herein may be implemented in accordance with any of these architectures or combinations of these architectures. By way of example and not limitation, FIGS. 1 and 2 provide two different implementations of a vector processor architecture. FIG. 1 illustrates an attached vector processor, which is attached to a general purpose computer, for instance, for the purpose of enhancing and improving the performance of that computer in numerical computational tasks. The attached vector processor achieves high performance by means of parallel processing with multiple functional units. FIG. 2, on the other hand, shows an example of a single instruction stream, multiple data streams (SIMD) vector processor. The SIMD vector processor has an architecture of a single computer or processor containing multiple processors functioning in parallel. The processing units function under the control of a common control unit, thus providing a single instruction stream and multiple data streams.

Digital Pre-Distortion (DPD) and the Accompanying Use of Linear Interpolation

Figure 3:
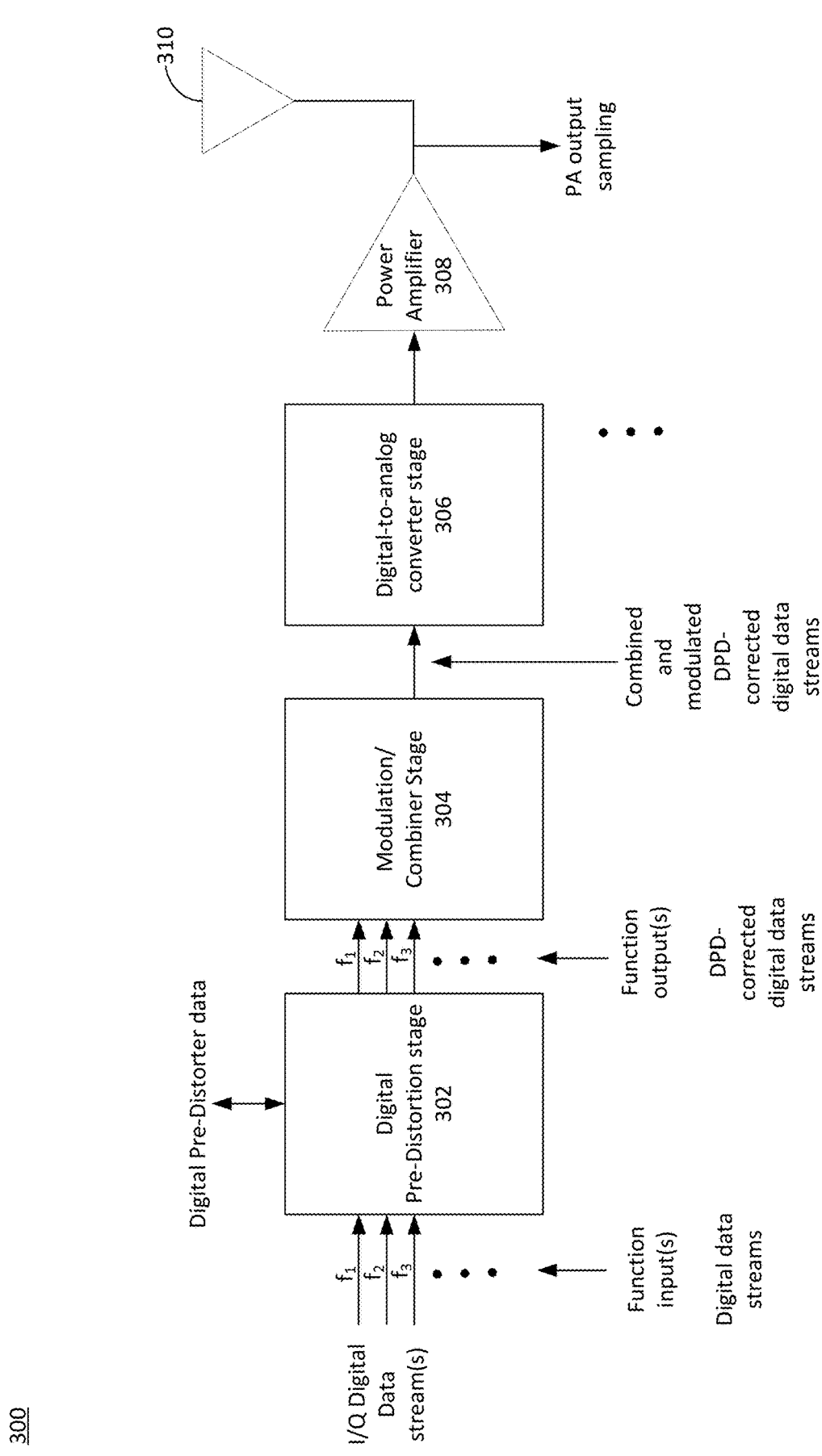
FIG. 3 illustrates an example block diagram of a transmitter chain architecture implementing digital pre-distortion, in accordance with one or more aspects of the present disclosure.

FIG. 3 illustrates an example block diagram of a transmitter chain architecture implementing digital pre-distortion (DPD), in accordance with one or more aspects of the present disclosure. The transmitter chain 300 as shown in FIG. 3 is by way of example and used for ease of explanation with respect to the application and use of DPD. The aspects described herein may be applied to any suitable type of transmitter chain architecture and/or modulation scheme in which DPD is implemented. Thus, the transmitter chain 300 as shown in FIG. 3 is by way of example and not limitation, and may include additional, fewer, or alternate components as shown in FIG. 3. Moreover, the aspects described herein are not limited to the particular application of DPD or exclusively to wireless data applications, and instead may be implemented in accordance with any suitable application in which data interpolation in one, two, or three dimensions (or more) is desirable by leveraging the architecture of vector processors and vector addressable memory, as further discussed herein.

The transmitter chain 300 as shown in FIG. 3 includes a DPD stage 302, a modulation/combiner stage 304, a digital-to-analog converter (DAC) stage 304, a power amplifier (PA) 308, and an antenna 310. The various components of the transmitter chain 300 may be implemented as hardware components, software components, or combinations of these, and may include the implementation of known designs, circuitry, and/or architecture to facilitate the wireless transmission of data in accordance with any suitable number and/or type of communication protocols or standards. Furthermore, the transmitter chain 300 may be from among several transmitter chains in an overall design implemented by a particular device that is configured to support wireless communications such as a mobile phone, a laptop computer, a tablet computer, etc.

For instance, the transmitter chain 300 may receive one or more generated digital data streams that are modulated via the modulation/combiner stage 304. The digital data stream(s) may include, for instance, in-phase (I) and quadrature-phase (Q) digital data streams or other suitable types of digital data streams depending upon the transmitter chain architecture (e.g. phase and amplitude data if the transmitter chain 300 is implemented as a polar transmitter design). The digital data streams may be provided in the baseband, at an intermediate frequency (IF), or at a radio frequency (RF) for transmission depending upon the particular implementation of the transmitter chain 300 and application.

Each one of the digital data streams may represent a frequency band for transmission through the transmitter chain 300. In an aspect, the modulation performed by the modulation/combiner stage 304 may be on a per-band basis. For instance, if each one of the digital data streams is identified with one of several frequency bands, then the DPD stage 302 applies DPD to each digital data stream on a per-band basis, with one DPD-corrected digital data stream per frequency band. As an illustrative example, for a tri-band DPD, the DPD stage 302 receives three digital data streams as inputs, and outputs three separate DPD-corrected digital data streams, which are then provided to the modulation/combiner stage 304. Each one of the DPD-corrected digital data streams is then fed to the modulation/combiner stage 304, modulated per each band, and then combined to produce a single combined and modulated DPD-corrected digital data stream output that is fed into the DAC stage 306. In this example, the DAC stage 306 may operate in the RF domain (versus the intermediate frequency (IF) or baseband), although this is again by way of example and not limitation. Continuing this example, the DAC stage 306 may be configured as an RF-sampling DAC, which may convert the combined and modulated DPD-corrected digital data stream to an analog signal for transmission via the PA 308 and coupled antenna 310. Thus, the DPD stage 302 may apply DPD in accordance with any suitable frequency or stage within the transmitter chain 300, such as at the baseband frequency, the IF frequency, or the RF frequency, in various aspects. The DPD stage 302 may be implemented, for instance, as part of a digital front end (DFE) used by the transmitter chain 300. Additional details regarding the application of the DPD is further discussed below.

Regardless of the particular implementation of the transmitter chain 300, the power amplifier (PA) 308 is configured to transmit the analog-converted signals associated with the combined and modulated DPD-corrected digital data streams. However, the PA 308 may have a non-linear gain that is the result of non-idealities such as compression, memory effects, etc. Thus, the DPD stage 302 functions to compensate for such non-idealities by applying DPD coefficients to the digital data streams on a per-band basis. To do so, the incoming digital data signals are treated as "function inputs" to a specific function that outputs the modified digital data samples as the "function outputs," which are DPD-corrected digital data streams as shown in FIG. 3. This may be done, for instance, by applying terms or coefficients of a DPD function to the digital data samples associated with the data streams using any suitable techniques to do so, including known techniques. The DPD function may thus be calculated to correct for non-linear behavior of the PA 308 such that the signals are transmitted with a desired linearity as intended. To do so, the DPD function may be calculated by monitoring or otherwise sampling the output of the PA 308 at various times for digital data streams with known properties (e.g. specific carrier frequencies, frequency bands, PA gain settings, etc.).

Each of the digital data streams may include a set of n discrete data samples, which constitute the digital data that is to be modulated and transmitted. Thus, and as further discussed below, the DPD stage 302 applies the DPD coefficients to each of the n samples within a digital data stream in accordance with a specific DPD function that is evaluated based upon the value of each data sample, which may be obtained by monitoring or otherwise sampling the output of the PA 308 as noted above. This DPD function (or more generally referred to herein as a "function" or a "continuous function") may be distilled into a table of coarse values. The table entries may represent a set of stored discrete data points, with each table entry representing the result of evaluating a continuous function (e.g. the DPD function) by evaluating the function using, as an independent variable of the continuous function, a respective discrete data sample.

This table of discrete data points may thus represent a range of function output values that correspond to specific points of discrete digital data stream sample values within a range of data sample values. For example, if the DPD function is $f(x)=x^2$ and the digital data stream sample values are expected to vary between 0 to 4000, then the table may store values within a range of addressable memory such that each table entry contains an evaluated result corresponding to a discrete digital data sample value x. For instance, the first entry in the table may correspond to the evaluated result f(0) (i.e. the minimum value of the range of digital data stream sample values), whereas the last entry in the table may correspond to the evaluated result f(4000) (i.e. the maximum value of the range of digital data stream sample values). The DPD stage 302 may thus retrieve or otherwise be provided with the result of the evaluation of the DPD function in the form of the DPD data as shown in FIG. 3. The DPD stage 302 may then apply the DPD terms or coefficients to each of the n digital data stream samples over time in accordance with any suitable techniques, including known techniques. In doing so, the DPD stage 302 generates the data samples associated with the DPD corrected digital data streams to track a desired DPD function output over time. This process may then be repeated for each data sample in each digital data stream and/or as new digital data streams are received, thus compensating for the non-linearity of the PA 308 as noted above.

However, to save memory space as noted above, it is preferable to condense the table entries stored in memory to a coarse representation of a smaller subset of data stream sample values. For instance, and using the example provided above, storing each evaluated value of f(x) incrementally by consecutive integer values f(0), f(1), f(2) . . . f(4000), would require a table with 4001 entries. Thus, aspects include condensing the size of this table to a coarser representation such as per increments of 10, 25, 50, 100, 250, etc., and then using linear interpolation to calculate the corresponding function outputs from the nearest set of discrete data points stored in the table within which a received digital data stream sample value falls. The determination of the granularity or coarseness of a table stored for this purpose may be determined based upon a recognized tradeoff in accuracy and the available memory.

It is noted that the above-referenced example of a function used to calculate DPD coefficients is oversimplified for ease of explanation, as practical transmitter chains may implement complex DPD functions for this purpose. For instance, DPD functions may be polynomials or otherwise contain complex dependencies between different frequency bands to efficiently correct for the non-linearity of the PA 308. For example, each one of the multiple digital data stream samples may be associated with a different frequency or frequency band, as noted above, which are then combined into a single DPD-corrected and modulated digital data stream and converted to analog values. The PA 308 may thus transmit a combined analog-converted data stream that is based upon multiple digital data streams of different frequency bands. The individual digital data streams may occupy different frequency bands and/or may occupy a significantly wide band (e.g. bands spaced apart by 1 GHz or more). The signals in other frequency bands may, when modulated, combined with one another, and transmitted, interfere with one another and/or influence signals in other frequency bands even though the signals may be spectrally separated from one another by a significant amount.

The non-linearity of the PA 308 in this case is more complex to address with a DPD function for the generation of the compensating DPD, and also further complicates how the interpolation is done to derive the desired function outputs. For example, a function used in accordance with a single-band DPD coefficient calculation may be expressed in Equation 1 below as follows:

$$f(x)=f(|x_n|)\cdot x_n \qquad \text{Eqn. 1}$$

With reference to Eqn. 1 above, $x_n$ may represent a digital data sample n at a point in time (e.g. a signal to be transmitted) with respect to a single-band digital data stream as shown in FIG. 3, for instance. However, when there are two digital data streams, each being identified with a different frequency band, then an example DPD function used in accordance with a dual-band DPD coefficient calculation may be expressed in Equations 2a and 2b below as follows:

$$\text{band 1;} f_1(x_1,x_2)=f_1(|x_{1,n}|,|x_{2,n}|)\cdot x_{1,n} \qquad \text{Eqn. 2a}$$

$$\text{band 2;} f_2(x_1,x_2)=f_2(|x_{1,n}|,|x_{2,n}|)\cdot x_{2,n} \qquad \text{Eqn. 2b}$$

With reference to Eqns. 2a and 2b above, $x_{1,n}$ may represent a digital data sample n at a point in time with respect to one of the digital data stream samples as shown in FIG. 3, for instance, for a first frequency band $f_1$. The term $x_{2,n}$ may represent a digital data sample n at a point in time with respect to the second one of the digital data stream samples as shown in FIG. 3, for instance, for a second frequency band $f_2$. In other words, the DPD correction may be applied to each digital data stream individually, one for each band in the respective equations 2a and 2b, and accounts for the contribution of the other frequency band in each case. Thus, the DPD function contains two independent variables: $|x_{1,n}|$, $|x_{2,n}|$, and the DPD function output may be evaluated using bi-linear or 2D linear interpolation, as further discussed herein. Alternatively, the two independent variables may be expressed mathematically for ease of explanation such that the discrete data samples $|x_{1,n}|$ are identified with an 'x' independent variable, and the discrete data samples $|x_{2,n}|$ are identified with a 'y' independent variable.

Furthermore, when the digital data stream contains signals of three different frequency bands, then an example DPD function used in accordance with a three-band DPD coefficient calculation may be expressed in Equations 3a, 3b, and 3c below as follows:

$$\text{band 1;} f_1(x_1,x_2,x_3)=f_1(|x_{1,n}|,|x_{2,n}|,|x_{3,n}|)\cdot x_{1,n} \qquad \text{Eqn. 3a}$$

$$\text{band 2;} f_2(x_1,x_2,x_3)=f_2(|x_{1,n}|,|x_{2,n}|,|x_{3,n}|)\cdot x_{2,n} \qquad \text{Eqn. 3b}$$

$$\text{band 3;} f_3(x_1,x_2,x_3)=f_3(|x_{1,n}|,|x_{2,n}|,|x_{3,n}|)\cdot x_{3,n} \qquad \text{Eqn. 3c}$$

With reference to Eqns. 2a and 2b above, $x_{1,n}$ may represent a digital data sample n at a point in time with respect to one of the digital data stream samples as shown in FIG. 3, for instance, for a first frequency band $f_1$. The term $x_{2,n}$ may represent a digital data sample n at a point in time with respect to the second one of the digital data stream samples as shown in FIG. 3, for instance, for a second frequency band $f_2$, and the term $x_{3,n}$ may represent a digital data sample n at a point in time with respect to the third one of the digital data stream samples as shown in FIG. 3, for instance, for a third frequency band $f_3$. Therefore, the DPD function in this case contains three independent variables:

$|x_{1,n}|$, $|x_{2,n}|$, $|x_{3,n}|$, and the DPD function output may be evaluated using tri-linear or 3D linear interpolation, as further discussed herein. Alternatively, the three independent variables may be expressed mathematically for ease of explanation such that the discrete data samples $|x_{1,n}|$ are identified with an 'x' independent variable, the discrete data samples $|x_{2,n}|$ are identified with a 'y' independent variable, and the discrete data samples $|x_{3,n}|$ are identified with a 'z' independent variable.

The aforementioned DPD functions are provided by way of example and not limitation, and the aspects described herein may implement any suitable number and/or type of function (which may or may not be used for DPD calculations) in accordance with any suitable number of independent variables. Moreover, and as further discussed below, the aspects described herein may implement vector processors in conjunction with vector addressable memory, in which both the stored data and the address of the stored data are vectors. This architecture may advantageously be exploited to simultaneously retrieve discrete data points stored in multiple data entries of vector addressable memory, which may then be used to perform the linear interpolation calculations as discussed herein to evaluate a continuous function in accordance with specific data sample values. Thus, unless otherwise specified, the term "linear interpolation" should not be interpreted as being limited to a single dimension or in accordance with a single variable. Instead, linear interpolation calculations as used herein may be applicable to single or multi-dimensional linear interpolations in accordance with any suitable number of dimensions and/or variables (e.g. bi-linear and tri-linear interpolation). The architecture and the functionality of this overall interpolation process is further discussed below with reference to FIG. 4.

Vector Processor Architecture

Figure 4:
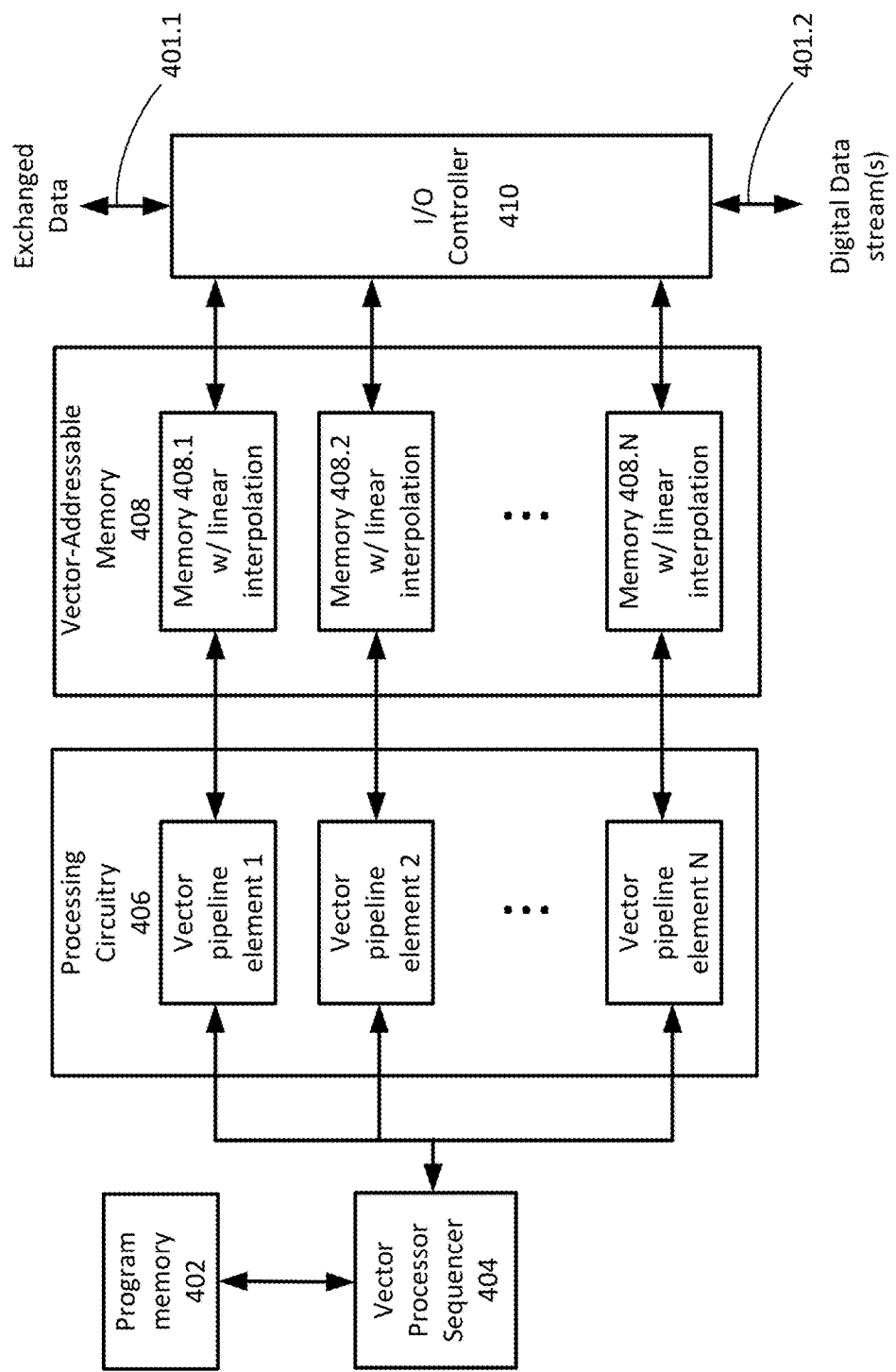
FIG. 4 illustrates an example block diagram of a vector processor architecture, in accordance with one or more aspects of the present disclosure.

FIG. 4 illustrates an example block diagram of a vector processor architecture, in accordance with one or more aspects of the present disclosure. Again, the aspects described herein may be implemented in accordance with any suitable type of application that utilizes data interpolation in accordance with a predefined continuous function that may be represented in an addressable lookup table (LUT). Such functions may be implemented for instance as part of the digital signal processing operations for wireless communications, digital pre-distortion (DPD) coefficient calculations, average signal measurement calculations over time, digital signal processing of signals transmitted or received via individual antenna data streams for multiple-input-multiple-output (MIMO) antenna systems, filter tap calculations, etc.

It is noted that the vector processor architecture 400 as shown and discussed with reference to FIG. 4 is by way of example and not limitation, and may include additional, alternate, or fewer components than those shown, in various aspects. The vector processor architecture 400 be implemented in accordance with any suitable type of device such as a user equipment (UE), base station, or any other suitable device that may implement wireless data transmissions in accordance with single band and/or multi-band data stream that uses DPD correction processing or otherwise implements data interpolation of entries stored in a LUT, as discussed herein. As shown in FIG. 4, the vector processor architecture 400 includes a program memory 402, a vector processor sequencer 404, processing circuitry 406, vector addressable memory 408, and a data interface 410.

In this example, the data interface 410 is configured as an input/output (I/O) controller that controls the flow of digital data stream samples to the other components of the vector processor architecture 400 via one or more wired and/or wireless links, such as links 401.1-401.2, which may be implemented as data buses for instance. As an example, the data interface 410 may be implemented with one or more drivers, buffers, buses, wired and/or wireless interconnects, ports, etc., to transmit and/or receive data in accordance with the links 401. The data interface 410 may receive new data samples associated with the digital data streams as discussed herein and shown in FIG. 3 for instance, via the link(s) 401.2, and store the data sample values in the vector-addressable memory 408 in accordance with any suitable addressing scheme such that the data sample values stored in the vector addressable memory 408 may be accessed or otherwise retrieved by the processing circuitry 406 as instructed by the vector processor sequencer 404, as further discussed below.

Additionally or alternatively, the data interface 410 may facilitate the transfer of any suitable type of data stored in the vector-addressable memory 408 to other components, such as those associated with the device in which the vector processor architecture 400 is implemented, for instance. As an example, the data interface 410 may enable the exchange of data stored in the vector-addressable memory 408 by one or more components (e.g. components associated with a DFE, components associated with DPD stage 302, etc.). This data may include, for instance, the resulting data sample value evaluations in accordance with the continuous function that is represented by the discrete data points stored in the vector-addressable memory 408 using linear interpolation between data point entries, as further discussed herein. The data interface 410 may facilitate other components not shown in FIG. 4 accessing, retrieving, or otherwise receiving any suitable type of data stored in the vector-addressable memory 408. Additionally or alternatively, the processing circuitry 406 may access, retrieve, or otherwise receive any suitable type of data stored in the vector-addressable memory 408 and provide this data to other components of the device in which the vector processor architecture 400 is implemented via the link(s) 401.1.

In an aspect, the program memory 402 is configured to store data and/or instructions (e.g. instruction sets) such that, when the instructions are executed by the processing circuitry 406, cause the processing circuitry 406 to perform various functions as described herein with respect to performing linear interpolation calculations to evaluate the digital data stream samples based upon the set of discrete data points stored in the vector-addressable memory 408. The program memory 402 may be implemented as any well-known volatile and/or non-volatile memory, including, for example, read-only memory (ROM), random access memory (RAM), flash memory, a magnetic storage media, an optical disc, erasable programmable read only memory (EPROM), programmable read only memory (PROM), etc. The program memory 402 may be non-removable, removable, or a combination of both. For example, the program memory 402 may be implemented as a non-transitory computer readable medium storing one or more executable instructions such as, for example, logic, algorithms, code, etc.

In an aspect, the processing circuitry 406 may be implemented as any suitable number and/or type of computer processors, which may function to execute the instructions stored in the program memory 402 and/or as instructed by the vector processor sequencer 404 and to otherwise carry out the various aspects as described herein. In an aspect, the processing circuitry 406 may be implemented as a vector processor and/or a vector engine, and may include any suitable number N of vector pipeline elements, as shown in FIG. 4. Each of these vector pipeline elements may be configured to receive and process data in accordance with instructions received from the vector processor sequencer 404, which may be determined via the vector processor sequencer 404 executing the instructions stored in the program memory 402. Thus, the vector pipeline elements and/or the processing circuitry 406 may include, in various aspects, a vector multiply accumulate unit (MAC) or vector MAC circuitry, a vector arithmetic logic unit (ALU), a vector data formatting unit (FMU), etc., which may be implemented as any suitable arrangement of digital logic circuitry. Aspects include the processing circuitry 406 being configured to perform the various calculations of the addresses for the vector addressable memory 408 (e.g. using the integer portion of the received data sample value) as well as computing the linear interpolation of the respective lookup values using the fractional portion of the received data sample, as discussed herein. Additionally or alternatively, the pipeline elements may facilitate the processing circuitry 406 performing the address and interpolation computations as discussed herein as part of a software-realized sequence of operations in addition to or instead of the use of dedicated hardware in the processing circuitry 406 to do so.

In an aspect, the processing circuitry 406 may implement vector MAC circuitry to perform the actual linear interpolation computations using the lookup values retrieved form the vector addressable memory 408. In various aspects, the continuous function that is evaluated in this manner may constitute part of or the entirety of the DPD function (or other suitable function) to provide the desired values for a particular application. For instance, if the DPD function is the expression $f(x)=f(|x_n|) \cdot x_n$ associated with Equation 1 above, then the interpolation computation may result in the processing circuitry (e.g. the vector MAC circuitry) calculating the portion $f(|x_n|)$. Continuing this example, the vector MAC circuitry may additionally calculate the overall function evaluation $f(x)$ by performing a multiplication of the interpolated result by the received data sample(s) associated with a particular digital data stream.

It is noted that although the aspects are described herein in terms of a vector processing architecture, this is by way of example and not limitation. The aspects described herein may be performed in accordance with any suitable type of processing architecture, including known types of processors, processor circuitry, and/or other suitable components. In accordance with such aspects, the vector pipeline elements may be replaced, for instance, with other suitable parallel processing components and/or the vector processor sequencer 404 may be replaced with any suitable type of sequencer to instruct the processing circuitry 406 with respect to specific operations to execute. As further discussed herein, such aspects may be particularly useful for instance, when software-based execution is implemented versus hard-based execution of instructions to perform address and/or interpolation calculations.

In an aspect, each vector pipeline element that forms part of the processing circuitry 406 may sequentially retrieve data sample values stored in the vector addressable memory 408 as instructed by the vector processor sequencer 404, evaluate the data sample values in accordance with a particular continuous function by performing linear interpolation of the sample value using the data points stored in the vector addressable memory 408, and store the result of evaluating the continuous function using the received data sample as the independent variable in the vector addressable memory 408. The processing circuitry 406 may additionally store other data in the vector addressable memory 408, such as intermediate values used in multiple stage linear interpolation calculations, for example, which may be accessed by the processing circuitry 406 as needed to perform such calculations.

For example, the vector processor sequencer 404 may be implemented as any suitable number and/or type of processors, hardware, and/or software and be configured to identify which addresses within the vector-addressable memory that each vector pipeline element should process at a particular point in time and for a particular data sample value within the digital data stream. The vector processor sequencer may receive this information via the data interface 410, for instance, although the specific interconnections are not shown in FIG. 4 for purposes of brevity. The vector processor sequencer 404 may also instruct each vector pipeline element regarding the addresses in the vector addressable memory 404 from which to retrieve data sample values, the addresses from which to retrieve the stored data points for evaluating data sample values using linear interpolation between the stored data points in the vector addressable memory 408, and the addresses in the vector addressable memory 408 that the results of the linear interpolation calculations should be stored. Thus, and as further discussed below, because the vector addressable memory 408 may store multiple tables storing ranges of discrete data points associated with different evaluated functions, the vector processor sequencer 404 may instruct the vector pipeline elements as to which addresses and thus set of stored data points to be referenced and used for the evaluation of a data sample value via linear interpolation. The vector processor sequencer 404 may be configured to provide different instructions to different vector pipeline elements in parallel (e.g. simultaneously or concurrently) and thus enable each vector pipeline element to perform calculations independently of one another in the same clock cycle or instructional cycle. This advantageously allows the processing circuitry 406 to retrieve several sets of data points from the vector-addressable memory 408, which are associated with different addresses within a range defined by an address vector, and to perform linear interpolations using this retrieved data as further discussed below.

In an aspect, the vector-addressable memory 408 may be implemented as any suitable type of memory and include any suitable number N of memories 408.1-408.N. Although illustrated in FIG. 4 as a separate block from the processing circuitry 406, the aspects described herein are not limited to this particular architecture, and the memories 408.1-408.N may alternatively or additionally be implemented as part of a common die, component, and/or package with the other components of the vector processor architecture 400, external to other components of the vector processor architecture 400, and/or integrated as part of one or more other components of the vector processor architecture 400. The memories 408.1-408.N may be implemented as any suitable type of vector-addressable data storage. For example, the memories 408.1-408.N may be implemented as any well-known volatile and/or non-volatile memory, including, for example, random access memory (RAM), read-only memory (ROM), flash memory, a magnetic storage media, an optical disc, erasable programmable read only memory (EPROM), programmable read only memory (PROM), etc. The memories 408.1-408.N may be non-removable, removable, or a combination of both. The implementation of RAM memory may be particularly useful, however, as reading and writing to this type of memory may be performed on the order of nanoseconds. Moreover, irrespective of the specific physical implementation of the memories 408.1-408.N, aspects include the data stored in the memories 408.1-408.N being formatted in a vector-addressable format as further discussed herein, and being addressed in accordance with a vector addressable memory storage architecture.

Aspects include the processing circuitry 406 including any suitable number and/or type of vector pipeline elements depending upon the particular application and implementation. Regardless of the number of vector pipeline elements, aspects include the processing circuitry 406 being implemented as any suitable type of components configured to execute instructions stored in the program memory 402 and/or as directed by the vector processor sequencer 404, as discussed herein. Thus, the vector pipeline elements may include, for instance, individual processors or processor cores of a larger processor architecture. As additional examples, the vector pipeline elements may be implemented as processing circuitry including any suitable combination of hardware and software components, as functional units, as programmable hardware components and/or processor engines configured to interpret and execute instructions, as directed by the vector processor sequencer 404 and/or for any other suitable purpose. In an aspect, the vector pipeline elements may be implemented in accordance with a vector processing pipeline architecture, for example, in which case the processing circuitry 406 may be implemented as a vector engine (VE) with any suitable architecture to facilitate this functionality.

Linear Interpolation Calculations

As discussed herein, aspects include the vector-addressable memory 408 storing a set of discrete data points, with each one of the set of discrete data points representing the result of evaluating a continuous function using a respective discrete data sample as an independent variable of the continuous function. Thus, if the received data sample matches the discrete data sample used to generate a corresponding stored data point in the set of data points, then no interpolation is needed. However, this is typically not the case, and thus aspects include the vector pipeline elements facilitating the processing circuitry 406 performing a linear interpolation to evaluate the received data sample in accordance with the particular continuous function using retrieved data points stored in the vector addressable memory 408.

Figure 5A:
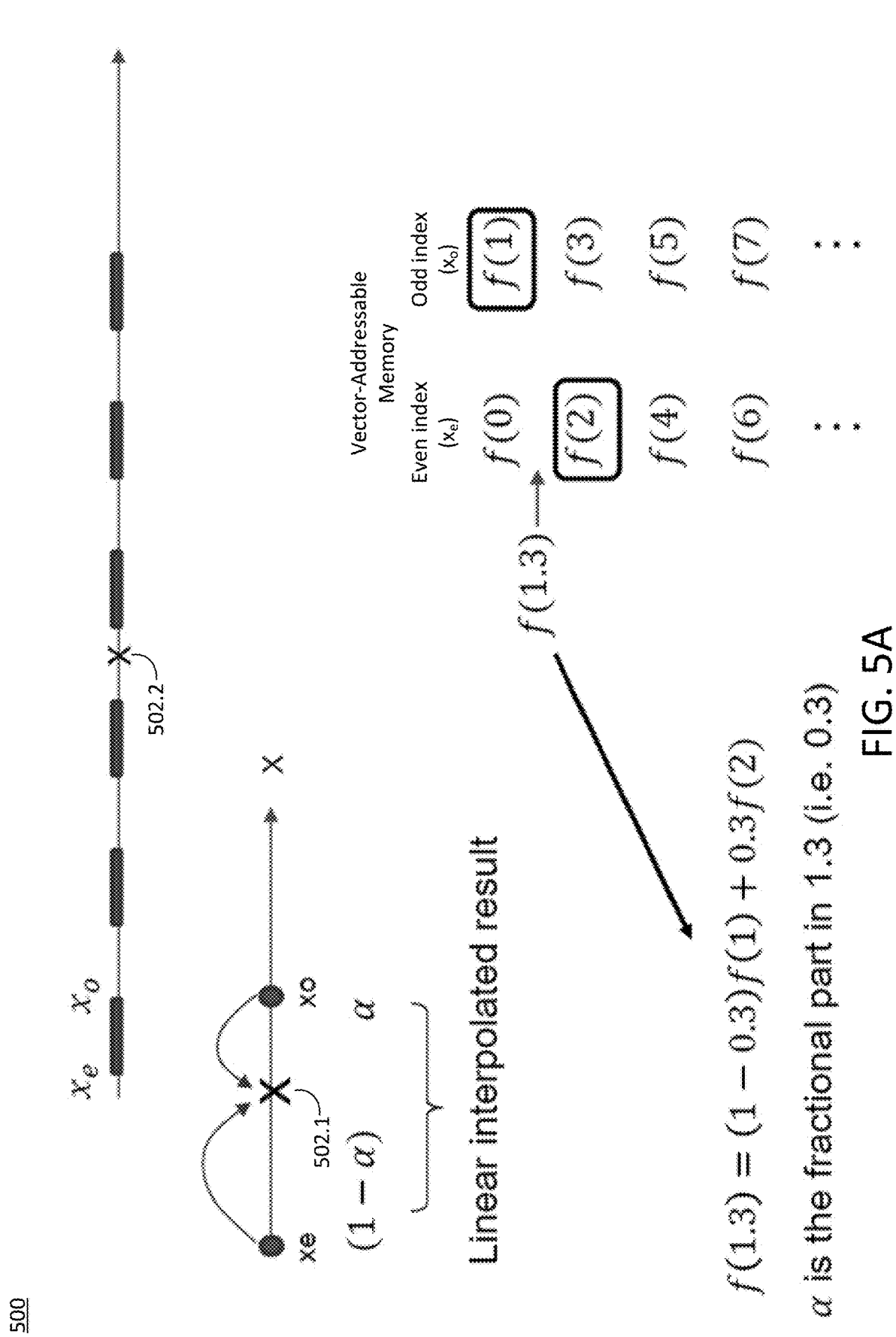
FIG. 5A illustrates an example linear interpolation methodology and an example accompanying vector addressable memory storage configuration for evaluation of a function with a single independent variable, in accordance with one or more aspects of the present disclosure.

An example of the linear interpolation process for a single independent variable is shown in FIG. 5A. This may be the case when, for example, a single frequency band is used for data transmission. Alternatively, this could be the case in the event that other frequency bands do not significantly influence the linearity of a particular data stream. In any event, this example assumes that the DPD function only needs to be expressed in terms of a single independent variable x, which is identified for a single data stream to be transmitted. In an aspect, the set of data points may be stored in the vector addressable memory 408 in any suitable format or addressable format. The aspects described herein use an even and odd formatting and organization to represent the set of data points as stored in the vector-addressable memory 408, but the aspects described herein are not limited to this specific arrangement and the set of data points may be stored in accordance with any format, organization, and/or structure in the vector-addressable memory 408.

As an example, the set of data points may be stored in the vector addressable memory 408 organized into even and odd indices. For instance, and continuing the example above for the single independent variable case, the vector addressable memory 408 may include any suitable number of memories 408.1-408.N, with each memory 408.1-408.N storing any suitable number of functions as respective tables of data points. Each table may be stored in a vector addressable emery 408.1-408.N as rows divided into two columns, with one column corresponding to even data sample value entries ($x_e$) and the other column corresponding to odd data sample entries ($x_o$). Thus, each stored data point associated with the evaluation of a data sample entry having an even integer value may be identified with the same column and a different row, whereas each stored data point associated with the evaluation of a data sample entry having an odd integer value may be identified with the same column and a different row. In this way, the vector addressable memories 408.1-408.N may store respective tables, with each table including a set of data points that correspond to the evaluation of data samples in accordance with a continuous function. The set of data points are thus interleaved across the vector addressable memory 408 with each row containing a pair of data points corresponding to the evaluation of a continuous function for an even data sample value and an odd data sample value.

Continuing this example, any received data sample from the digital data stream as shown and discussed herein may then be identified as being within an adjacent pair of even and odd index data point entries. The nearest pair of data points in the table of data points stored in the vector addressable memory 408 may be alternatively referred to herein as a subset of data points or entries. With continued reference to FIG. 5A, the set of data points stored in the vector addressable memory 408 may include data points corresponding to the evaluation of a continuous function f in accordance with an independent variable x such that the data points in the even indices f(0), f(2), f(4), etc. correspond to the result of evaluating respective data samples having a value of 0, 2, 4, etc. Likewise, the odd indices f(1), f(3), f(5), etc. correspond to the result of evaluating respective data samples having a value of 1, 3, 5, etc. Therefore, aspects include evaluating a received data sample value corresponding to the independent variable of the continuous function that deviates from the integer values that correspond to the stored set of data points using a linear interpolation between a particular subset (e.g. pair) of stored data points what span the received data sample.

To do so, aspects include the vector processor sequencer 404 determining a vector address of a subset of discrete data points that correspond to an evaluation of the continuous function for each respectively received data sample value, which are used to evaluate the continuous function by performing a linear interpolation between the subset of discrete data points. This may be performed, for instance, via the vector processor sequencer 404 using an integer portion and a fractional portion ($\alpha$) of the received data sample. As an illustrative example, the data point 502.1 may correspond to the evaluation of a received data sample value of 0.3, which has an integer portion of 0 and a fractional portion of 0.3. Thus, aspects include the vector processor sequencer 404 identifying, from the integer portion, the nearest even data sample point entry ($x_e$) as f(0) and the nearest odd data sample point entry ($x_o$) as f(1). Moreover, using the fractional portion of 0.3, the vector processor sequencer 404 may instruct the vector pipeline processing element to evaluate f(0.3) by performing a linear interpolation between the stored data points f(0) and f(1) in the vector addressable memory 408.

In the above example using f(0.3), the even and odd index entries of data points f(0) and f(1) are stored in the same row. As an additional illustrative example, other received data sample values may fall between even and odd data sample entries in the vector addressable memory 408. For instance, the data point 502.2 may correspond to the evaluation of a received data sample value of 1.3, which has an integer portion of 1 and a fractional portion of 0.3. Thus, aspects include the vector processor sequencer 404 identifying the nearest even data sample point entry ($x_e$) as f(2) and the nearest odd data sample point entry ($x_o$) as f(1) from the integer portion. Moreover, using the fractional portion of 0.3, f(1.3) may be evaluated by performing a linear interpolation between f(1) and f(2), with the details shown in FIG. 5A for this particular example calculation.

In an aspect, the nearest integer data point entries may be retrieved from the vector addressable memory 408 within the same clock cycle or instructional cycle regardless of whether the received data sample spans the same row (e.g. for f(0.3), or spans multiple rows (e.g. for f(1.3)). That is, as was the case for the received data sample of 1.3, the received data sample may lie between points from two different data entry pairs stored in the vector addressable memory. With conventional architectures, this would require reading from different addresses over several clock cycles or instructional cycles as the data points f(1) and f(2) are located in different rows and columns. However, the aspects described herein advantageously utilize the vector addressable memory 408 in which the stored data and the address are each vectors, and thus allow the entire contents of the vector addressable memory 408 to be retrieved in a single clock cycle or instructional cycle, with the specific discrete data points f(1) and f(2) being retrieved simultaneously from the vector addressable memory 408 and then used for the interpolation calculation as instructed by the vector processor sequencer 404.

In an aspect, the processing circuitry 406 may receive a hardware instruction from the vector processor sequencer 404 to perform a dedicated instruction. In this context, the hardware instruction may be a single, fused instruction that instructs the processing circuitry 406 (e.g. the vector MAC circuitry implemented by the processing circuitry 406) to perform specific instructions over one or more clock cycles. Thus, the entirety of the linear interpolation computation, which may include rounding, adding, multiplications, rounding, scaling, etc., may be executed using this single hardware instruction. This may include, for instance, executing the interpolation computation for a specific set of data points retrieved from the vector addressable memory 408, as discussed herein. In an aspect, the vector processor sequencer 404 is configured to access the instructions stored in the program memory 402, which may include or more instructions sets, and to provide such a hardware instruction to the processing circuitry 406. This hardware instruction may further enable the processing circuitry 406 to automatically determine, via a hardware operation or calculation, the address of each row (or multiple rows) in the vector addressable memory 408 from which to read the stored data points using the integer portion of the received data sample, and then to perform the actual linear interpolation computation using the fractional portion of the received data sample.

In various aspects, the hardware instruction may instruct the processing circuitry 406 to perform both an address lookup and a linear interpolation computation as part of a single hardware instruction, or these may be performed as part of separate hardware instructions. Thus, the hardware instruction facilitates the processing circuitry 406 saving address computation cycles by retrieving the data points from the vector addressable memory 408 in a single clock cycle or instructional cycle. In other words, the aspects described herein may advantageously utilize hardware instructions as opposed to spending cycles computing the addresses, allowing for the computation of the addresses in the vector addressable memory 408 and/or the linear interpolation computation to be executed in a single clock cycle or instructional cycle.

Alternatively, aspects also include the processing circuitry 406 being configured as any suitable type of processing circuitry, which may not include the vector pipeline elements and/or may not form part of a vector processor architecture. In any event, the processing circuitry 406 may implement software instructions (e.g. general-purpose instructions) instead of or in addition to a hardware instruction to calculate the addresses in the vector addressable memory 408 and/or to perform the linear interpolation computation. In accordance with such aspects, the vector MAC circuitry or other suitable circuitry associated with the processing circuitry 406 (e.g. processing circuitry not identified with a vector processing architecture) may receive such software instructions from the vector processor sequencer 404 and/or from any suitable source that may generate such instructions.

In accordance with the software instruction aspects, the processing circuitry 406 may perform the same types of computations to determine the addresses in the vector addressable memory 408 and/or the linear interpolation computations as discussed herein with respect to the hardware instructions, but may do so using a software-executed operation that may include the use of general-purpose instructions, for example. This may require one or more clock cycles or instructional cycles in addition to or instead of the use of hardware instruction processing via the processing circuitry 406 (which may perform such operations in a single clock cycle or instructional cycle, or optionally using additional clock cycles or instructional cycles) to do so. Thus, in accordance with such aspects, the processing circuitry 406 may execute multiple operations in parallel and/or sequentially (e.g. over multiple clock or instructional cycles) to perform the address and/or the linear interpolation computations. In other words, the processing circuitry 406 may calculate the addresses in the vector addressable memory 408 and/or calculate the linear interpolation from the data retrieved from these addresses using a hardware-executed operation (e.g. using a hardware instruction received from the vector processor sequencer 404) or using a software-executed operation (e.g. using general purpose instructions that may or may not be part of a vector processor architecture).

Figure 5B:
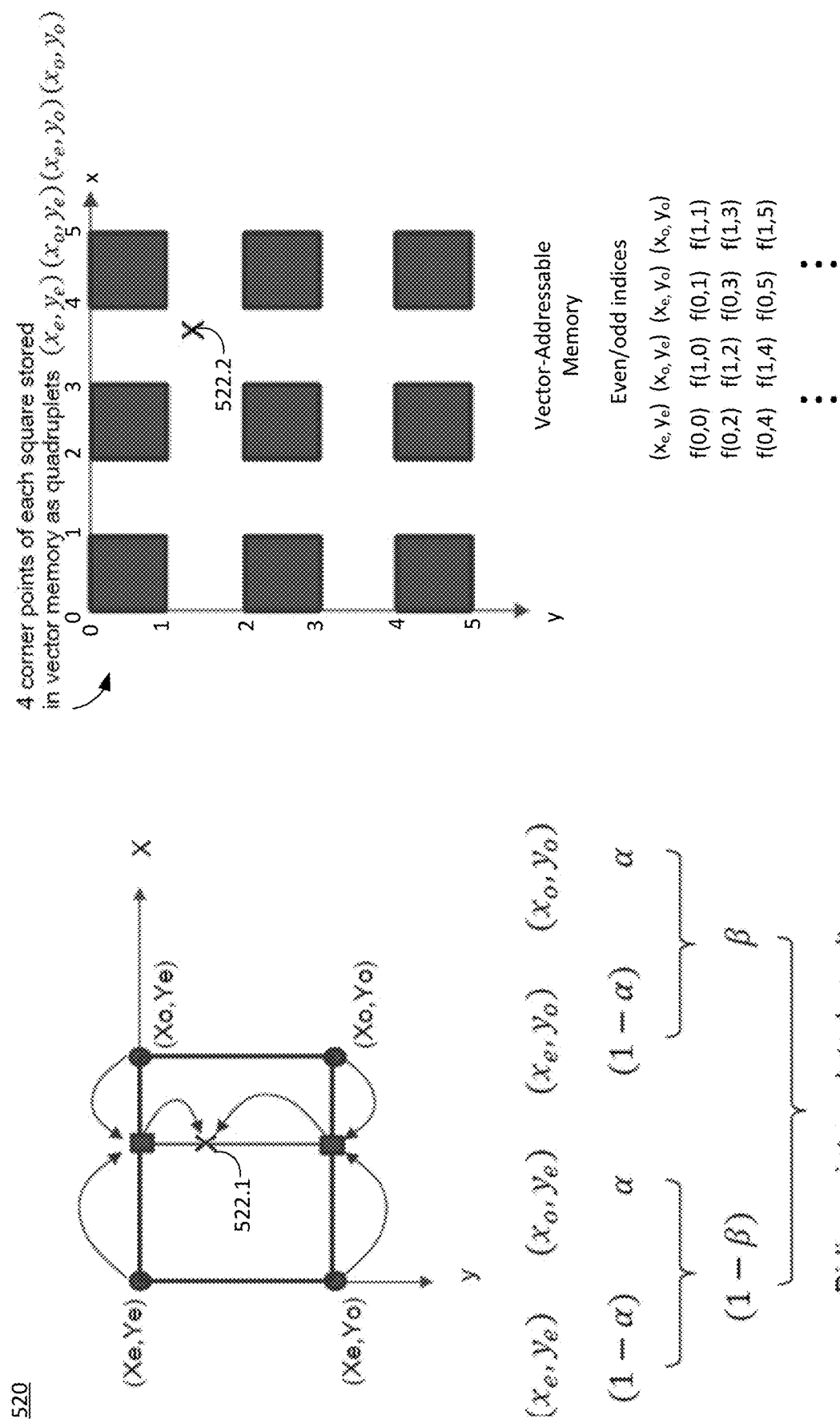
FIG. 5B illustrates an example bi-linear interpolation methodology and an example accompanying vector addressable memory storage configuration for evaluation of a function with two independent variables, in accordance with one or more aspects of the present disclosure.

An example of a bi-linear interpolation process for a two independent variable function is shown in FIG. 5B. This may be the case when, for example, two frequency bands are used for data transmission. Thus, this example assumes that a DPD function (or other suitable function) is expressed in terms of two independent variables x and y, which are identified with the frequency bands of each respective data stream to be transmitted. Again, the set of data points identified with the evaluation of this two independent variable function may be stored in the vector addressable memory 408 in any suitable addressable format, such as an even and odd formatting and organization (in terms of the y variable in this example). However, the aspects are not limited to this specific arrangement.

In an aspect, and as shown in FIG. 5B, the set of data values associated with the evaluation of various data sample values in accordance with the two independent variable function may be stored in the vector addressable memory using a quadruplet arrangement with an even and odd index associated with each variable. In other words, for two independent variables x and y, each row stored in the vector addressable memory 408 may represent each combination of even/odd x data points and even/odd y data points, which yields the 4 combinations or data points identified with the quadruplet as shown in FIG. 5B. This may represent, for instance, expanding the storage of the vector addressable memory 408 as shown in FIG. 5A to four columns of stored data points, with each row representing a two-dimensional (2D) square or plane as opposed to a one-dimensional line associated with each row of the vector addressable memory arrangement shown in FIG. 5A. In other words, in this arrangement, each column of the stored vector addressable memory may correspond to a specific pairing of the independent variables x and y, such that each row represents the data points for a quadruplet $(x_e, y_e), (x_o, y_e), (x_e, y_o), (x_o, y_o)$ of data points as shown in FIG. 5B.

As noted above for the single independent variable case, aspects include the vector pipeline elements retrieving the nearest integer data point entries (x, y) from the vector addressable memory 408 within the same clock cycle or instructional cycle regardless of whether the received data sample spans the same row (e.g. occupies the same quadruplet such as the data point 522.1) or spans multiple rows (e.g. occupies a space between quadruplets such as the data point 522.2). Again, this may be implemented via the use of a hardware instruction that is provided to the processing circuitry 406 via the vector processor sequencer 404. For example, the data point 522.2 actually spans data entries of four different rows, as it does not share x, y coordinates with any of the adjacent quadruplets as shown in FIG. 5B. As shown in FIG. 5B, the identification of the closest entries in the vector addressable memory 408, which are used to perform the bi-linear interpolation, may include the identification of two fractional values α and β, respectively, one for each dimension used due to the presence of the two independent variables. Again, as noted above for the single independent variable case, this identification may be performed, for instance, by the vector processor sequencer 404 using the instructions stored in the program memory 402, which may then provide instructions to one or more of the vector pipeline elements regarding which address from among the stored set of data points (i.e. which entries) to use for the bi-linear interpolation calculations.

Thus, the identification of the closest entries in the vector addressable memory 408 may include the vector processor sequencer 404, for example, repeating the process as described above for the single independent variable case in FIG. 5A, first by identifying the closest x-variable in the x-axis with respect to the data point entries $x_e$ and $x_o$ using the integer portion of the data sample value associated with the x independent variable. Then, the vector processor sequencer 404 may identify (using the already-identified data points closest to the x-variable data sample) the closest y-variable data points in the y-axis with respect to the data point entries $y_e$ and $y_o$ using the integer portion of the data sample value associated with the y independent variable shown in FIG. 5B for point 522.1 for instance. Again, regardless of the number of rows spanned in the vector addressable memory, to obtain the closest data points, the aspects described herein advantageously utilize the vector addressable memory 408 in which the stored data and the address are each vectors. This allows the entire contents of the vector addressable memory 408 to be retrieved in a single clock cycle or instructional cycle, with the specific set of four, two-coordinate (x,y) data points that are used for a bi-linear interpolation calculation by the processor circuitry 406 being instructed by the vector processor sequencer 404.

To provide a numerical example of the bi-linear interpolation process, consider a received data sample having x, y values corresponding to 0.7, 3.6. In this example, the vector processor sequencer 404 may calculate a hardware instruction using the integer portion of the x and y values 0 and 3, respectively, to identify the addresses in the vector addressable memory 408 for the processing circuitry 406 to fetch the data points associated with the entries f(0,4), f(1,4), f(0,3), f(1,3). Next, the vector processor sequencer 404 may use the fractional portion of the x, y values corresponding to 0.7 and 0.6, respectively, to provide a hardware instruction to the processing circuitry 406 to perform bi-linear interpolation between the data points stored in these entries to compute f(0.7,3.6). This hardware instruction may instruct the processing circuitry 406 to calculate a first result equal to [0.3f(0,4)+0.7 f(1,4)], to calculate a second result equal to [0.3f(0,3) +0.7 f(1,3)], and the final result of the bi-linear interpolation as [0.6 (first result)+0.4 (second result)].

Figure 5C:
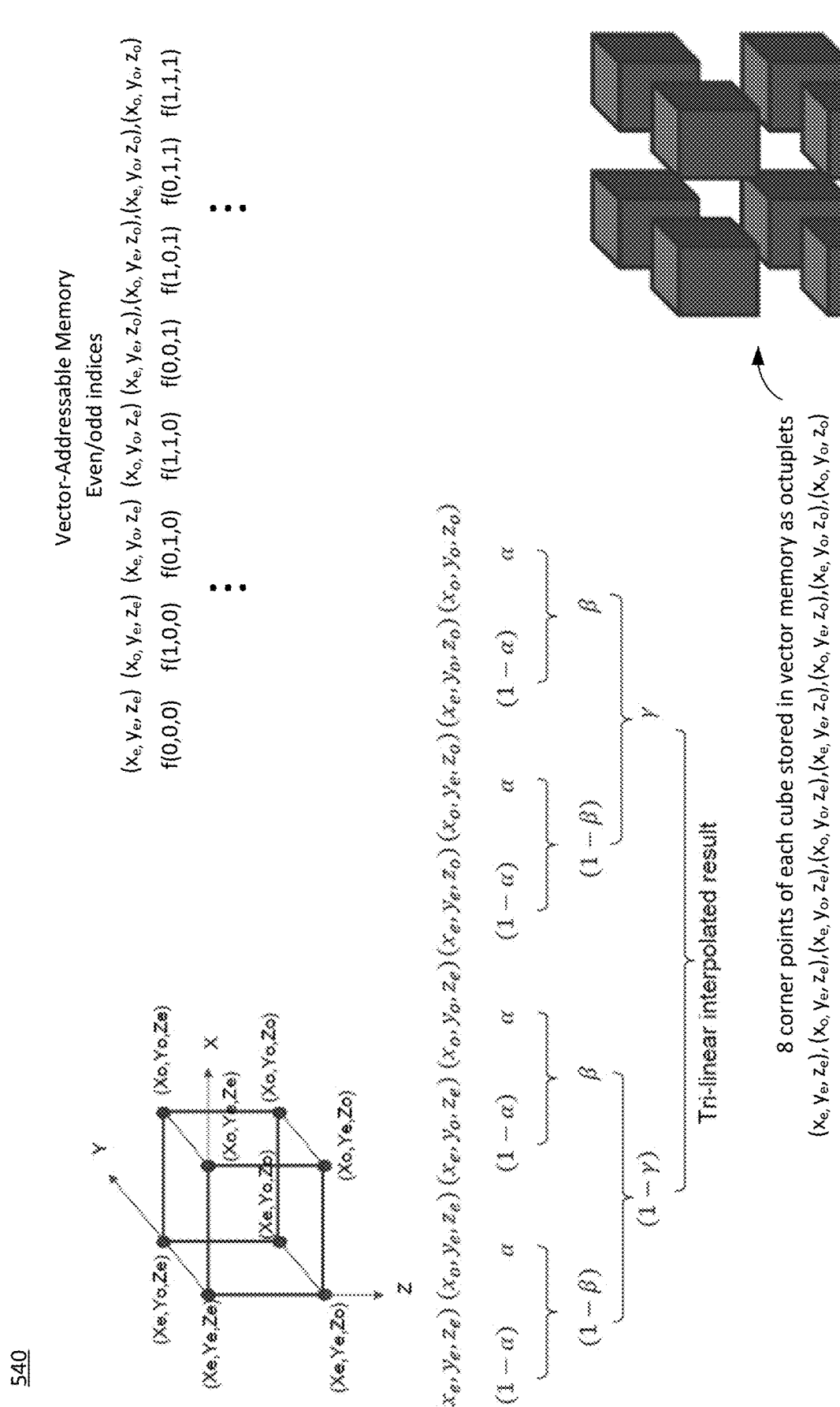
FIG. 5C illustrates an example tri-linear interpolation methodology and an example accompanying vector addressable memory storage configuration for evaluation of a function with three independent variables, in accordance with one or more aspects of the present disclosure.
Figure 5D:
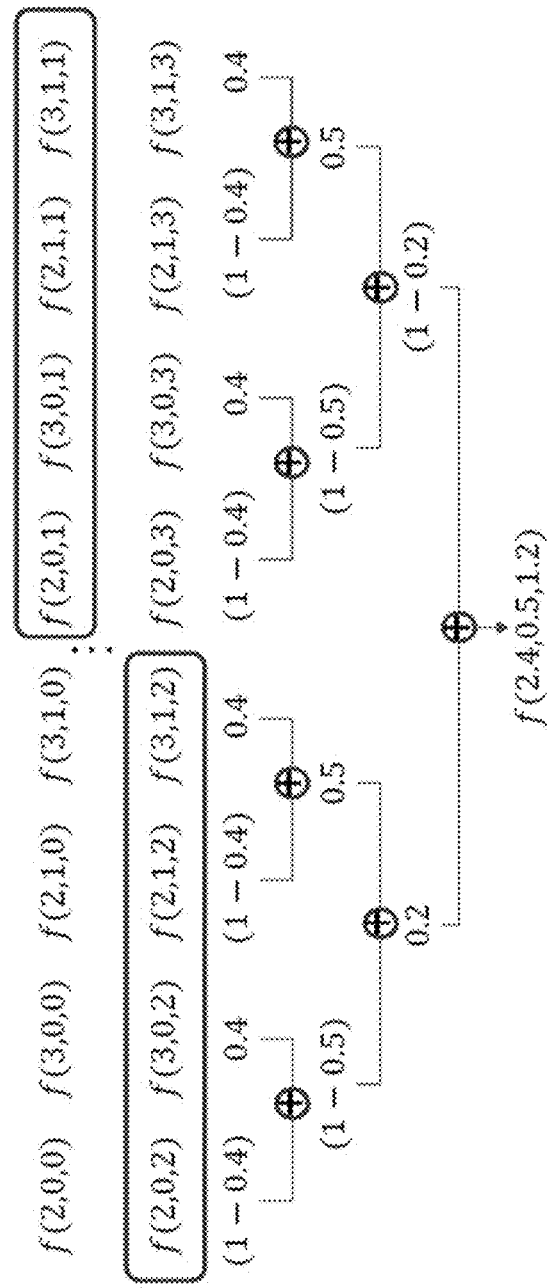
FIG. 5D illustrates an example tri-linear interpolation calculation, in accordance with one or more aspects of the present disclosure.

An example of a tri-linear interpolation process for a three independent variable function is shown in FIGS. 5C-5D. This may be the case when, for example, three frequency bands are used for data transmission. Thus, this example assumes that a DPD function (or other suitable function) is expressed in terms of three independent variables x, y, and z, which are identified with the frequency bands of each respective data stream to be transmitted. Again, the set of data points identified with the evaluation of this three independent variable function may be stored in the vector addressable memory 408 in any suitable addressable format. For example, for three independent variables x, y, and z, each row stored in the vector addressable memory 408 may represent each combination of even/odd x data points, even/odd y data points, and even/odd z data points, which yields the 8 combinations or data points identified with the octuplet as shown in FIG. 5C). However, the aspects are not limited to this specific arrangement. In an aspect, and as shown in FIG. 5C, the set of data values associated with the evaluation of various data samples in accordance with the three independent variable function may be stored in the vector addressable memory 408 using a octuplet arrangement with an even and odd index associated with each one of the three variables. This may represent, for instance, further expanding the storage of the vector addressable memory 408 as shown in FIG. 5B to eight columns of stored data points, with each row representing a three-dimensional (3D) cube as opposed to a one-dimensional line associated with each row of the vector addressable memory arrangement shown in FIG. 5A for the single independent variable function example and the 2D square associated with each row of the vector addressable memory arrangement shown in FIG. 5B for the two independent variable function example. In other words, in this arrangement, each column of the stored vector addressable memory may correspond to a specific even/off index pairing of the independent variables x, y, and z such that each row represents the data points for an octuplet:

$(x_e, y_e, z_e), (x_o, y_e, z_e), (x_e, y_o, z_e),(x_o, y_o, z_e),(x_e, y_e, z_o),(x_o, y_e, z_o),(x_e, y_o, z_o),(x_o, y_o, z_o)$, as shown in FIGS. 5C-5D.

Thus, the nearest integer data point entries (x, y, z) to a specific data sample value may be identified and retrieved from the vector addressable memory 408 within the same clock cycle or instructional cycle regardless of whether the received data sample value spans the same row (i.e. the same cube or octuplet) or spans multiple rows (e.g. occupies a space between octuplets). As shown in FIG. 5C, the identification of the closest entries in the vector addressable memory 408, which are used to perform the tri-linear interpolation, may include the identification of three fractional values α, β, and γ, respectively, one for each dimension used due to the presence of the three independent variables. This identification may be performed, for instance, by the vector processor sequencer 404 using the instructions stored in the program memory 402, which may then provide the hardware instructions to one or more of the vector pipeline elements regarding which address from among the stored set of data points (i.e. which entries) to retrieve the respective data points to use for the tri-linear interpolation calculations.

Thus, the identification of the closest entries in the vector addressable memory 408 may include repeating the process as described above for the single and dual independent variable cases in FIGS. 5A and 5B. For example, the vector processor sequencer 404 may first identify the closest data point in the x-axis with respect to the data point entries $x_e$ and $x_o$ using the integer portion of the data sample value associated with the x independent variable, identifying (using the already-identified data points closest to the x-variable data sample) the closest y-variable in the y-axis with respect to the data point entries $y_e$ and $y_o$ using the integer portion of the data sample value associated with the y independent variable, and then finally identifying (using the already-identified data points closest to the x-variable data sample and the y-variable data sample) the closest z-variable data points in the z-axis with respect to the data point entries $z_e$ and $z_o$ using the integer portion of the data sample value associated with the z independent variable. Again, regardless of the number of rows spanned in the vector addressable memory, to obtain the closest data points, the aspects described herein advantageously utilize the vector addressable memory 408 in which the stored data and the address are each vectors. This allows the entire contents of the vector addressable memory 408 to be retrieved in a single clock cycle or instructional cycle using the hardware instruction provided by the vector processor sequencer 404, with the specific set of eight, three-coordinate (x,y,z) data points that are used for a tri-linear interpolation calculation by the processor circuitry 406 being instructed by the vector processor sequencer 404.

An example tri-linear interpolation calculation is shown in further detail in FIG. 5D. In particular, the example shown in FIG. 5D may be performed for a received data sample value associated with a digital data stream that is identified with the three independent variable function stored in the vector addressable memory 408. This may include, for instance, a digital data stream from among three digital data streams, each being associated with a separate frequency band for transmission. The function stored in the vector addressable memory 408 may be identified with a DPD function, and the received data sample may include the data values (x,y,z) of (2.4,0.5,1.2), which may be evaluated in accordance with the DPD function represented by the discrete data points stored in the vector addressable memory 408 to obtain the DPD coefficients for that data stream sample.

To do so, and as shown in FIG. 5D, the nearest even and odd data point entries are first identified as indicated by the boxes in FIG. 5D using the integer portion of the x, y, and z data sample, which correspond to 2, 0, and 1 in this example, respectively. Thus, and as shown in FIG. 5D, the closest set of even and odd data points stored in the vector addressable memory 408 includes the set of octuplets that are closest to the x (e.g. between 2 and 3), y (e.g. between 0 and 1), and z (between 1 and 2) data point sample values of 2.4, 0.5, 1.2. Next, to evaluate f(2.4,0.5,1.2), aspects include one or more of the vector pipeline elements within the processing circuitry 406 retrieving the subset of respective data points from the stored table of data points that are associated with each data point entry of the octuplet data set as shown in FIG. 5D. For instance, a processing pipeline element may retrieve the even/odd index data points including f(2,0,2), f(3,0,2), f(2,1,2), f(3,1,2), f(2,0,1), f(3,0,1), f(2,1,1), and f(3,1,1). As shown in FIG. 5D, the tri-linear interpolation may use the fractional portion of each data sample coordinate value in a series of stages to repeatedly perform linear interpolation, first with the x-variable (0.4), then the y-variable (0.5), and then the z-variable (0.2), as discussed above for the 1D linear interpolation case.

Again, the addresses associated with each of the data point entries stored in the vector addressable memory 408 may be identified as part of an overall address vector, with the vector processor sequencer 404 identifying the specific address locations within the address vector for a vector pipeline element to retrieve for performing the tri-linear interpolation calculations for a specific data sample value. In this way, a single vector pipeline associated with the processing circuitry 406 may retrieve each of the data points used to perform the tri-linear interpolation calculation for a received data sample in a single clock cycle or instructional cycle, as the entire range of data points may be accessed in a single clock cycle or instructional cycle as part of a single vector operation. Aspects include each vector pipeline being configured to independently operate on separate data sample values for each separate digital data stream, and evaluate each one (e.g. calculate f(x,y,z)) in accordance with the appropriate level of linear interpolation depending upon the number of frequency bands and independent variables upon which the stored function is based. As an example, each vector pipeline element may individually and separately function in a manner that is dedicated to each digital data stream to evaluate the data samples in accordance with the stored function. Aspects include each vector pipeline element operating independently on multiple data streams regardless of the number of data point entries or the particular linear interpolation to be performed (e.g. for 1D and/or 2D linear interpolation calculations as described above.

As discussed above, the use of hardware instructions enables the processing circuitry 406 to obtain the data points stored in the vector addressable memory 408 by leveraging vector storage architecture, such that each data point may be retrieved in a single clock cycle or instructional cycle. This may include, for instance, retrieving each set of data points that may span multiple rows and/or addresses of the vector memory addressable memory 408 within a single clock cycle or instructional cycle, as noted above. This may be the case irrespective of the number of independent variables that are used, although the processing circuitry 406 may utilize additional clock cycles or instructional cycles to perform the data interpolation calculations in accordance with the retrieved data points. For instance, the actual interpolation calculations may be performed using a single hardware instruction or computed in software using the vector multiply accumulate (MAC) circuitry of the processing circuitry 406. For example, aspects include the processing circuitry 406 retrieving the data points stored in the vector addressable memory 408 in a single cycle. Then, aspects include the processing circuitry 406 calculating the 1D, 2D, or 3D linear interpolation in a single additional clock cycle or instructional cycle for any of the 1D, 2D, or 3D cases when a hardware-executed operation is performed or for the 1D case when software-executed operation is performed by the processing circuitry 406. Additionally, aspects include the processing circuitry 406 using a software-executed operation of two additional clock cycles (for the 2D case), or three additional clock cycles or instructional cycles (in the 3D case) (e.g. via the vector MAC circuitry of the processing circuitry 406), to perform the linear interpolation calculations.

Again, the specific organization of data points grouped by even and odd pairings, as well as the specific number of data points for the different number of independent variable cases, is by way of example and not limitation. As an example, the processing circuitry 406 may be implemented as a vector processor having any suitable number of pipeline elements to enable vector parallelism in accordance with any suitable value. As an example, the processing circuitry 406 may be implemented with a vector parallelism of 32, which may include 32 pipeline elements and allow for 32 data components to be processed in a single clock cycle or instructional cycle. In such a case, and using the three-independent variable case as an illustrative example, the vector addressable memory 408 could alternatively store 4 octuplets per row (with a total of 32 columns), thus enabling the processing circuitry 406 to calculate 32 values simultaneously. With this in mind, the number of clock cycles or instructional cycles referenced above for the 1D, 2D, and 3D linear interpolation calculations is again by way of examples, as the level of vector parallelism may influence how many clock cycles or instructional cycles are required to perform such calculations in each case, recognizing a tradeoff between cost, complexity, and application needs in various aspects.

Figure 6:
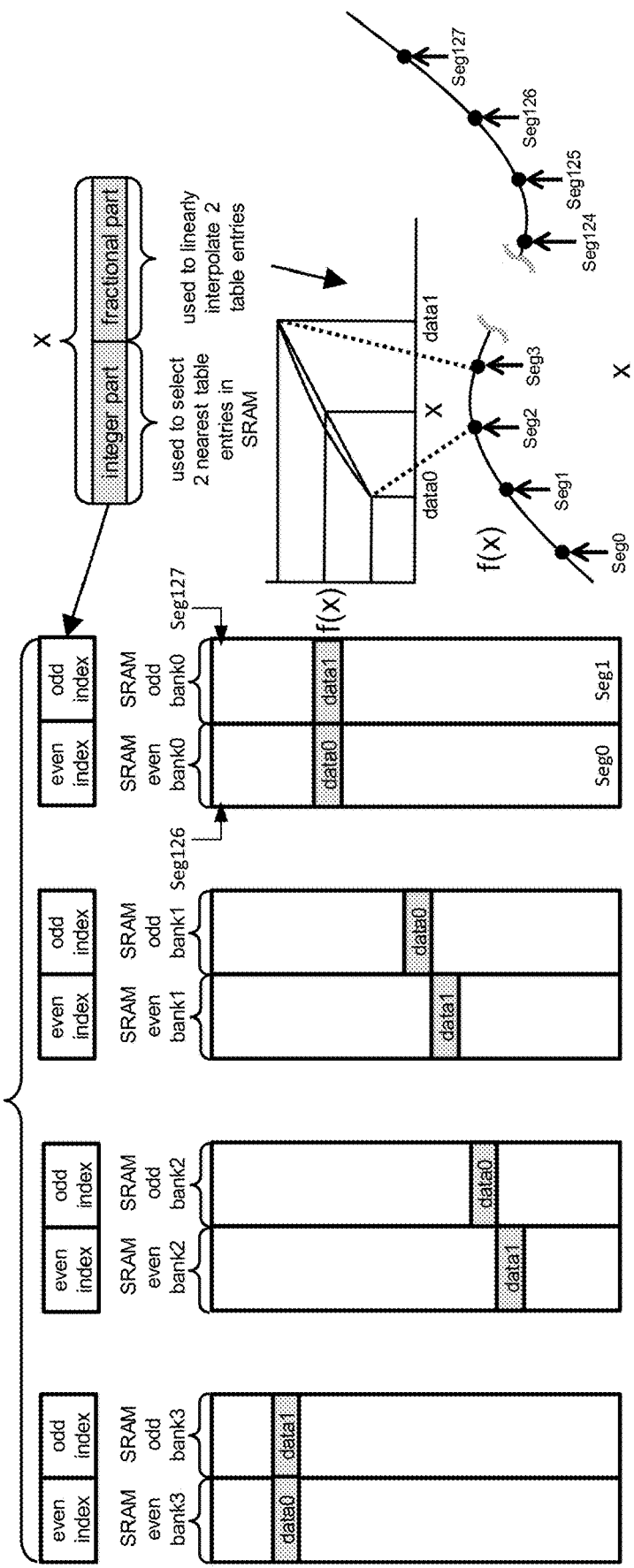
FIG. 6 illustrates an example of executing parallel data point entry lookups in vector addressable memory in a single vector operation, in accordance with one or more aspects of the present disclosure.

To provide another example of the organization of data points stored in the vector addressable memory 408, reference is now made to FIG. 6, which illustrates an example of executing parallel data point entry lookups in vector addressable memory in a single vector operation, in accordance with one or more aspects of the present disclosure. In an aspect, the set of discrete data points stored in the vector addressable memory may be organized in any suitable manner, such as the even and odd data values as discussed herein. Thus, the vector addressable memory may be identified with any suitable number of data banks, each of which may be identified with the same physical memory or separate memories. For instance, the vector addressable memory 408 as shown in FIG. 4 may include the N sets of memories 408.1-408.N, with each individual memory 408.1-408.N as shown in FIG. 4 storing any suitable number of discrete data points associated with a particular function as a data vector.

For example, each of the memories 408.1-408.N may be comprised of any suitable number of physical memories and/or memory banks, such as static RAM (SRAM), for example. If the even and odd organization structure is used as discussed herein, then each row or element stored in the data vector (i.e. each discrete data point f(0), f(1), etc. constituting the entirety of the data points in the table) within the memory 408.1-408.N is associated with 2 physical memories or data banks, one data bank for the even discrete data points and another data bank for the odd discrete data points. The total number of data point entries, i.e. the total number of discrete data points stored in a memory 408.1-408.N that constitute the overall table of data entries, are thus interleaved across the 2 data banks (e.g. even and odd data banks).

In the example shown in FIG. 6, 64 even discrete data point entries are stored in an even memory bank and the 64 odd discrete data point entries are stored in an odd memory bank. In other words, a vector having a number n of elements (e.g. discrete data points entries, or rows, 64 in this example), will implement n pairs of physical RAM per function. In an aspect, each of the memories 408.1-408.N may store any suitable number of functions in a respective table represented by each set of physical RAM bank pairs, with four such RAM bank pairs shown in FIG. 6. As is the case in the example used herein with reference to FIG. 6, each RAM bank pair may store the discrete data points associated with the same function, with the entirety of data represented by all RAM bank pairs for that same function being associated with a range of addresses identified with an address vector. This address vector may be used to access the entirety of the data stored across all data bank pairs for the same function, thus facilitating concurrent or parallel discrete data point lookups for different data sample values across each separate set of RAM bank pairs. Alternatively, the memories 408.1-408.N may store (individually, or with respect to different memories 408.01-408.N) data bank pairs representing tables of discrete data points for different functions. In this latter scenario, the memories 408.1-408.N may store, for example, bank pairs for different functions to facilitate the evaluation of the same data sample point in accordance with different functions, or evaluating different discrete data sample values in accordance with different respectively stored tables of functions, in various aspects.

Turning back to the example shown in FIG. 6, each data bank pair 1-4 in this example stores the same function represented by 64 even and 64 odd discrete data points. Each of the data bank pairs may constitute a single vector addressable range of memory interleaved across the two different physical SRAM entries in the example as shown in FIG. 6. Thus, in one vector operation, a vector pipeline element may simultaneously retrieve data for evaluating four different received data samples in accordance with the same function that is stored in each respective data bank pair 1-4. As shown in FIG. 6 and described herein, each segment stored in the data bank pairs ('data0' for even data point entries and 'data1' for odd data point entries) is associated with a discrete data point f(x) for a defined continuous function f. The example shown in FIG. 6 is with respect to a single independent variable function, although the data bank pairs may be expanded to 4 or 8 pairs, respectively, to represent additional discrete data points for two and three independent variable functions, as discussed herein.

Example Device Implementing a Vector Processor Supporting Linear Interpolation

Figure 7:
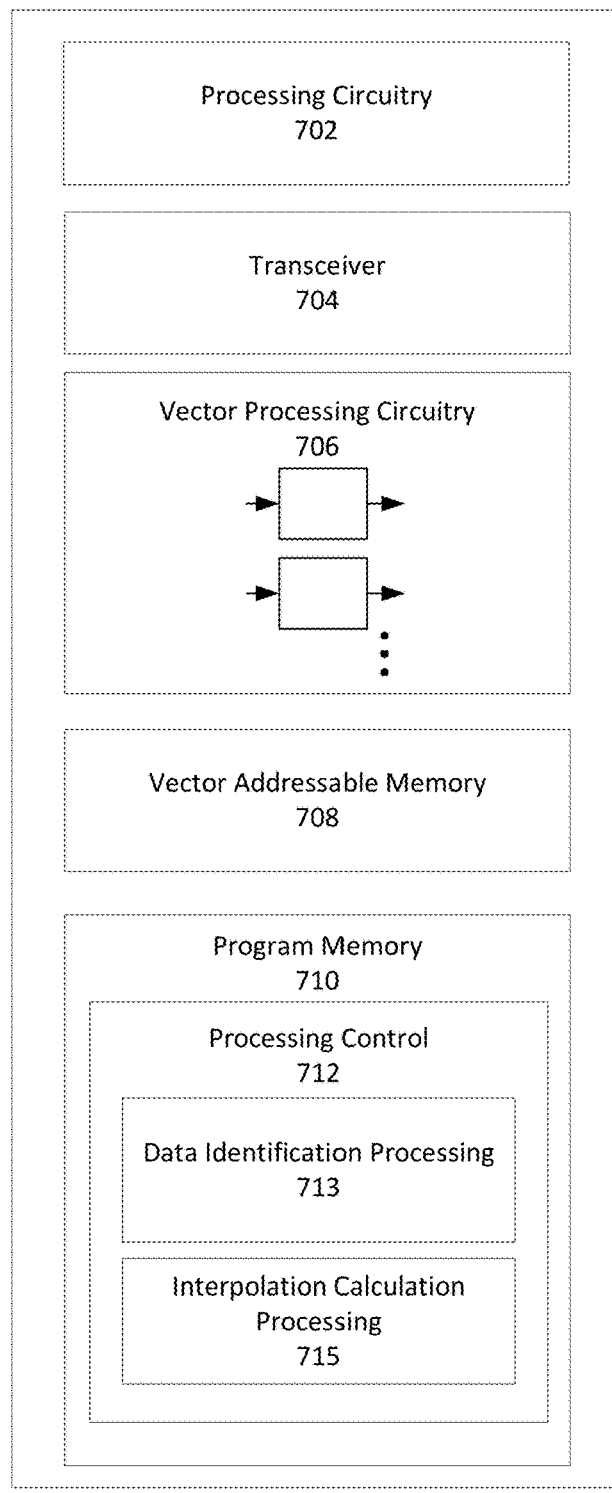
FIG. 7 illustrates an example device, in accordance with one or more aspects of the present disclosure.

FIG. 7 illustrates an example device, in accordance with one or more aspects of the present disclosure. The device 700 may be identified with one or more devices implementing a vector processor architecture to perform data interpolations using discrete data points retrieved from a vector addressable memory, such as the vector processor architecture 400 as shown and discussed herein with reference to FIG. 4 for instance. For example, the device 700 may be identified with a user equipment (UE) or other suitable device configured to perform wireless communications such as a mobile phone, a laptop computer, a tablet, etc., which may include one or more components configured to transmit and receive radio signals, to perform digital signal processing, filter processing, DFE processing, etc.

As further discussed below, the device 700 may perform the aspects as discussed herein with respect to the vector processor architecture 400 as shown and discussed with respect to FIG. 4 to receive and evaluate data sample values in accordance with a continuous function stored as discrete data points in a vector addressable memory. To do so, the device 700 may include processing circuitry 702, a transceiver 704, vector processing circuitry 706, vector addressable memory 708, and a program memory 710. The components shown in FIG. 7 are provided for ease of explanation, and aspects include the device 700 implementing additional, less, or alternative components as those shown in FIG. 7.

In various aspects, the processing circuitry 702 may be configured as any suitable number and/or type of computer processors, which may function to control the device 700 and/or other components of the device 700. The processing circuitry 702 may be identified with one or more processors (or suitable portions thereof) implemented by the device 700. For example, the processing circuitry 702 may be identified with one or more processors such as a host processor, a digital signal processor, one or more microprocessors, graphics processors, baseband processors, microcontrollers, an application-specific integrated circuit (ASIC), part (or the entirety of) a field-programmable gate array (FPGA), etc. As another example, the processing circuitry 702 (or at least portions of the processing circuitry 702) may be identified with the vector processor sequencer 404 and accompanying functionality, as shown and discussed herein with respect to FIG. 4.

In any event, aspects include the processing circuitry 702 being configured to carry out instructions to perform arithmetical, logical, and/or input/output (I/O) operations, and/or to control the operation of one or more components of device 700 to perform various functions associated with the aspects as described herein. For example, the processing circuitry 702 may include one or more microprocessor cores, memory registers, buffers, clocks, etc., and may generate electronic control signals associated with the components of the device 700 to control and/or modify the operation of these components. For example, aspects include the processing circuitry 702 communicating with and/or controlling functions associated with the transceiver 704, the vector processing circuitry 706, the vector addressable memory 706, and/or the program memory 710.

In an aspect, the transceiver 704 may be implemented as any suitable number and/or type of components configured to transmit and/or receive data packets and/or wireless signals in accordance with any suitable number and/or type of communication protocols. The transceiver 704 may include any suitable type of components to facilitate this functionality, including components associated with known transceiver, transmitter, and/or receiver operation, configurations, and implementations. Although depicted in FIG. 7 as a transceiver, the transceiver 704 may include any suitable number of transmitters, receivers, or combinations of these that may be integrated into a single transceiver or as multiple transceivers or transceiver modules. For example, the transceiver 704 may include components typically identified with an RF front end and/or a transmitter chain (e.g. the transmitter chain 300) and include, for example, DPD stages, modulators, combiners, DACs, antennas, ports, power amplifiers (PAs), RF filters, mixers, local oscillators (LOs), low noise amplifiers (LNAs), upconverters, downconverters, channel tuners, etc. Thus, the transceiver 704 may be configured as any suitable number and/or type of components configured to facilitate receiving and/or transmitting data and/or signals in accordance with one or more communication protocols, which may use digital pre-distortion applied to one or more digital data streams as discussed herein.

For example, the transceiver 704 may be implemented as any suitable number and/or type of components to support wireless communications such as analog-to-digital converters (ADCs), digital to analog converters, intermediate frequency (IF) amplifiers and/or filters, modulators, demodulators, baseband processors, etc. The digital data streams to be transmitted via the transceiver 704 (e.g. digital data streams), may include one or more discrete digital data samples that are evaluated in accordance with a continuous function to calculate DPD terms or coefficients to be applied to the digital data streams on a per-band and per-stream basis, as noted above. Thus, the vector processing circuitry 706 may be identified with the processing circuitry 406 as shown and described herein with reference to FIG. 4, whereas the vector addressable memory 708 may be identified with the vector-addressable memory 408.

The vector-addressable memory 708 and the program memory 710 may be separate memories or integrated or otherwise combined to form a single memory that stores both program instructions and function data (e.g. the data banks of discrete data points representing one or more functions as discussed herein). In any event, aspects include the program memory 710 storing data and/or instructions such that, when executed by the processing circuitry 702 and/or the vector processing circuitry 706, cause the device 700 to perform various functions as described herein with respect to the evaluation of data samples in accordance with stored discrete data points associated with a specific function. This may include, for instance, controlling, monitoring, and/or regulating the flow of data through the vector pipeline elements associated with the vector processing circuitry 706. The vector addressable memory 708 and/or the program memory 710 may be implemented as any well-known volatile and/or non-volatile memory, including, for example, read-only memory (ROM), random access memory (RAM), flash memory, a magnetic storage media, an optical disc, erasable programmable read only memory (EPROM), programmable read only memory (PROM), etc. The vector addressable memory 708 and/or the program memory 710 may be non-removable, removable, or a combination of both. For example, the vector addressable memory 708 and/or the program memory 710 may be implemented as a non-transitory computer readable medium storing one or more executable instructions such as, for example, logic, algorithms, code, etc.

As further discussed below, the instructions, logic, code, etc., stored in the program memory 710 are represented by the various modules as shown in FIG. 7, which may enable the aspects disclosed herein to be functionally realized. Alternatively, the modules shown in FIG. 7 associated with the program memory 710 may include instructions and/or code to facilitate control and/or monitor the operation of hardware components implemented via the device 700 (e.g. the vector processing circuitry 706). In other words, the modules shown in FIG. 7 are provided for ease of explanation regarding the functional association between hardware and software components. Thus, aspects include the processing circuitry 702 and/or the vector processing circuitry 706 executing the instructions stored in these respective modules in conjunction with one or more hardware components to perform the various functions associated with the aspects as further discussed herein.

The processing control engine 712 may perform the functionality described herein as discussed with reference to controlling and/or monitoring the vector processing circuitry 706. In an aspect, the executable instructions stored in the data identification processing module 713 may facilitate, in conjunction with execution via the processing circuitry 702, the device 700 receiving data samples associated with digital data streams to be transmitted. This may include, for instance, a determination of the specific locations in the vector addressable memory 708 that contain data points that are closest to a data sample value using the integer portion of the data sample value, as discussed herein. This may also include, for example, retrieving the discrete data points from the vector addressable memory 708 and/or instructing one or more vector pipeline elements included as part of the vector processing circuitry 706 to begin processing the retrieved data point to calculate an interpolated evaluation of the data sample value in accordance with the stored function, as discussed herein.

In an aspect, the executable instructions stored in the interpolation calculation processing module 715 may facilitate, in conjunction with execution via the processing circuitry 702, the vector processing circuitry 706 calculating an interpolated result of evaluating a received data sample value using the closest data points retrieved form the vector addressable memory 708, which define a continuous function, as discussed herein. This may include, for instance, the calculation of any suitable type of linear interpolation depending upon the number of independent variables to be solved, such as single, bi-linear interpolation, or tri-linear interpolation, as discussed herein.

EXAMPLES

The following examples pertain to further aspects.

Example 1 is a vector processor, comprising: a vector addressable memory configured to store a set of discrete data points, with each one of the set of discrete data points representing a result of evaluating a continuous function using a respective discrete data sample as an independent variable of the continuous function; a data interface configured to receive a data sample associated with a digital data stream, the data sample corresponding to the independent variable of the continuous function; and processing circuitry configured to: retrieve, from among the set of discrete data points stored in the vector addressable memory, a subset of discrete data points corresponding to an evaluation of the continuous function for respective data samples; evaluate the continuous function using the received data sample as the independent variable of the continuous function by performing a linear interpolation between the subset of discrete data points; and store, in the vector addressable memory, a result of evaluating the continuous function using the received data sample as the independent variable.

In Example 2, the subject matter of Example 1, wherein: the continuous function has two independent variables, the received data sample includes data corresponding to the two independent variables of the continuous function, and the processing circuitry is configured to evaluate the continuous function using the received data sample as the two independent variables of the continuous function by performing a bi-linear interpolation between the subset of discrete data points.

In Example 3, the subject matter of any combination of Examples 1-2, wherein: the continuous function has three independent variables, the received data sample includes data corresponding to the three independent variables of the continuous function, and the processing circuitry is configured to evaluate the continuous function using the received data sample as the three independent variables of the continuous function by performing a tri-linear interpolation between the subset of discrete data points.

In Example 4, the subject matter of any combination of Examples 1-3, wherein the received digital data stream is from among a plurality digital data streams, each one of the plurality of digital data streams being associated with a different frequency band, and wherein the continuous function represents a function used to obtain digital pre-distortion (DPD) coefficients to be applied to the digital data stream prior to transmission via a power amplifier, the continuous function including a number of independent variables equal to the number of the different frequency bands.

In Example 5, the subject matter of any combination of Examples 1-4, wherein the processing circuitry further includes a vector multiply accumulate unit (MAC) configured to perform the linear interpolation between the subset of discrete data points using the received data sample as a hardware-executed operation in accordance with a hardware instruction.

In Example 6, the subject matter of any combination of Examples 1-5, wherein the processing circuitry is configured to perform the linear interpolation between the subset of discrete data points using the received data sample as a software-executed operation over two or more instructional cycles.

In Example 7, the subject matter of any combination of Examples 1-6, wherein the processing circuitry is configured to calculate addresses in the vector addressable memory storing the subset of discrete data points as a hardware-executed operation in accordance with a hardware instruction, the calculation of the addresses in the vector addressable memory being based upon an integer portion of the received data sample.

In Example 8, the subject matter of any combination of Examples 1-7, wherein the processing circuitry is configured to calculate addresses in the vector addressable memory storing the subset of discrete data points as a software-executed operation over two or more instructional cycles, the calculation of the addresses in the vector addressable memory being based upon an integer portion of the received data sample.

Example 9 is a device, comprising: a vector addressable memory configured to store a set of discrete data points, with each one of the set of discrete data points representing a result of evaluating a continuous function using a respective discrete data sample as an independent variable of the continuous function; a data interface configured to receive a data sample associated with a digital data stream, the data sample corresponding to the independent variable of the continuous function; and a vector processing engine configured to: retrieve, from among the set of discrete data points stored in the vector addressable memory, a subset of discrete data points corresponding to an evaluation of the continuous function for respective data samples; evaluate the continuous function using the received data sample as the independent variable of the continuous function by performing a linear interpolation between the subset of discrete data points; and store, in the vector addressable memory, a result of evaluating the continuous function using the received data sample as the independent variable.

In Example 10, the subject matter of Example 9 wherein: the continuous function has two independent variables, the received data sample includes data corresponding to the two independent variables of the continuous function, and the vector processing engine is configured to evaluate the continuous function using the received data sample as the two independent variables of the continuous function by performing a bi-linear interpolation between the subset of discrete data points.

In Example 11, the subject matter of any combination of Examples 9-10, wherein: the continuous function has three independent variables, the received data sample includes data corresponding to the three independent variables of the continuous function, and the vector processing engine is configured to evaluate the continuous function using the received data sample as the three independent variables of the continuous function by performing a tri-linear interpolation between the subset of discrete data points.

In Example 12, the subject matter of any combination of Examples 9-11, wherein the received digital data stream is from among a plurality digital data streams, each one of the plurality of digital data streams being associated with a different frequency band, and wherein the continuous function represents a function used to obtain the digital pre-distortion (DPD) coefficients to be applied to the digital data stream prior to transmission via a power amplifier, the continuous function including a number of independent variables equal to the number of the different frequency bands.

In Example 13, the subject matter of any combination of Examples 9-12, wherein the processing circuitry further includes a vector multiply accumulate unit (MAC) configured to perform the linear interpolation between the subset of discrete data points using the received data sample as a hardware-executed operation in accordance with a hardware instruction.

In Example 14, the subject matter of any combination of Examples 9-13, wherein the processing circuitry is configured to perform the linear interpolation between the subset of discrete data points using the received data sample as a software-executed operation over two or more instructional cycles.

In Example 15, the subject matter of any combination of Examples 9-14, wherein the processing circuitry is configured to calculate addresses in the vector addressable memory storing the subset of discrete data points as a hardware-executed operation in accordance with a hardware instruction, the calculation of the addresses in the vector addressable memory being based upon an integer portion of the received data sample.

In Example 16, the subject matter of any combination of Examples 9-15, wherein the processing circuitry is configured to calculate addresses in the vector addressable memory storing the subset of discrete data points as a software-executed operation over two or more instructional cycles, the calculation of the addresses in the vector addressable memory being based upon an integer portion of the received data sample.

Example 17 is a non-transitory computer-readable memory having instructions stored thereon that, when executed by one or more processors of a vector processing engine, cause the vector processing engine to: access a vector addressable memory configured to store a set of discrete data points, with each one of the set of discrete data points representing a result of evaluating a continuous function using a respective discrete data sample as an independent variable of the continuous function; receive a data sample associated with a digital data stream, the data sample corresponding to the independent variable of the continuous function; retrieve, from among the set of discrete data points stored in the vector addressable memory, a subset of discrete data points corresponding to an evaluation of the continuous function for respective data samples; evaluate the continuous function using the received data sample as the independent variable of the continuous function by performing a linear interpolation between the subset of discrete data points; and store, in the vector addressable memory, a result of evaluating the continuous function using the received data sample as the independent variable.

In Example 18, the subject matter of Example 17, wherein: the continuous function has two independent variables, the received data sample includes data corresponding to the two independent variables of the continuous function, and the instructions, when executed by one or more processors of the vector processing engine, further cause the vector processing engine to evaluate the continuous function using the received data sample as the two independent variables of the continuous function by performing a bi-linear interpolation between the subset of discrete data points.

In Example 19, the subject matter of any combination of Examples 17-18, wherein: the continuous function has three independent variables, the received data sample includes data corresponding to the three independent variables of the continuous function, and the instructions, when executed by one or more processors of the vector processing engine, further cause the vector processing engine to evaluate the continuous function using the received data sample as the three independent variables of the continuous function by performing a tri-linear interpolation between the subset of discrete data points.

In Example 20, the subject matter of any combination of Examples 17-19, wherein the received digital data stream is from among a plurality digital data streams, each one of the plurality of digital data streams being associated with a different frequency band, and wherein the continuous function represents a function used to obtain digital pre-distortion (DPD) coefficients to be applied to the digital data stream prior to transmission via a power amplifier, the continuous function including a number of independent variables equal to the number of the different frequency bands.

In Example 21, the subject matter of any combination of Examples 17-20, wherein the instructions, when executed by one or more processors of the vector processing engine, further cause the vector processing engine to perform the linear interpolation between the subset of discrete data points using the received data sample as a hardware-executed operation in accordance with a hardware instruction.

In Example 22, the subject matter of any combination of Examples 17-21, wherein the instructions, when executed by one or more processors of the vector processing engine, further cause the vector processing engine to perform the linear interpolation between the subset of discrete data points using the received data sample as a software-executed operation over two or more instructional cycles.

In Example 23, the subject matter of any combination of Examples 17-22 wherein the instructions, when executed by one or more processors of the vector processing engine, further cause the vector processing engine to calculate addresses in the vector addressable memory storing the subset of discrete data points as a hardware-executed operation in accordance with a hardware instruction, the calculation of the addresses in the vector addressable memory being based upon an integer portion of the received data sample.

In Example 24, the subject matter of any combination of Examples 17-23, wherein the instructions, when executed by one or more processors of the vector processing engine, further cause the vector processing engine to calculate addresses in the vector addressable memory storing the subset of discrete data points as a software-executed operation over two or more instructional cycles, the calculation of the addresses in the vector addressable memory being based upon an integer portion of the received data sample.

Example 25 is a vector processor, comprising: a vector addressable memory means for storing a set of discrete data points, with each one of the set of discrete data points representing a result of evaluating a continuous function using a respective discrete data sample as an independent variable of the continuous function; a data interface means for receiving a data sample associated with a digital data stream, the data sample corresponding to the independent variable of the continuous function; and processing means for: retrieving, from among the set of discrete data points stored in the vector addressable memory means, a subset of discrete data points corresponding to an evaluation of the continuous function for respective data samples; evaluate the continuous function using the received data sample as the independent variable of the continuous function by performing a linear interpolation between the subset of discrete data points; and store, in the vector addressable memory, a result of evaluating the continuous function using the received data sample as the independent variable.

In Example 26, the subject matter of Example 25, wherein: the continuous function has two independent variables, the received data sample includes data corresponding to the two independent variables of the continuous function, and the processing means evaluates the continuous function using the received data sample as the two independent variables of the continuous function by performing a bi-linear interpolation between the subset of discrete data points.

In Example 27, the subject matter of any combination of Examples 25-26, wherein: the continuous function has three independent variables, the received data sample includes data corresponding to the three independent variables of the continuous function, and the processing means evaluates the continuous function using the received data sample as the three independent variables of the continuous function by performing a tri-linear interpolation between the subset of discrete data points.

In Example 28, the subject matter of any combination of Examples 25-27, wherein the received digital data stream is from among a plurality digital data streams, each one of the plurality of digital data streams being associated with a different frequency band, and wherein the continuous function represents a function used to obtain digital pre-distortion (DPD) coefficients to be applied to the digital data stream prior to transmission via a power amplifier, the continuous function including a number of independent variables equal to the number of the different frequency bands.

In Example 29, the subject matter of any combination of Examples 25-28, wherein the processing means further includes a vector multiply accumulate unit (MAC) means for performing the linear interpolation between the subset of discrete data points using the received data sample as a hardware-executed operation in accordance with a hardware instruction.

In Example 30, the subject matter of any combination of Examples 25-29, wherein the processing means performs the linear interpolation between the subset of discrete data points using the received data sample as a software-executed operation over two or more instructional cycles.

In Example 31, the subject matter of any combination of Examples 25-30, wherein the processing means calculates addresses in the vector addressable memory storing the subset of discrete data points as a hardware-executed operation in accordance with a hardware instruction, the calculation of the addresses in the vector addressable memory being based upon an integer portion of the received data sample.

In Example 32, the subject matter of any combination of Examples 25-31, wherein the processing means calculates addresses in the vector addressable memory storing the subset of discrete data points as a software-executed operation over two or more instructional cycles, the calculation of the addresses in the vector addressable memory being based upon an integer portion of the received data sample.

Example 33 is a device, comprising: a vector addressable memory means for storing a set of discrete data points, with each one of the set of discrete data points representing a result of evaluating a continuous function using a respective discrete data sample as an independent variable of the continuous function; a data interface means for receiving a data sample associated with a digital data stream, the data sample corresponding to the independent variable of the continuous function; and a vector processing means for: retrieving, from among the set of discrete data points stored in the vector addressable memory, a subset of discrete data points corresponding to an evaluation of the continuous function for respective data samples; evaluating the continuous function using the received data sample as the independent variable of the continuous function by performing a linear interpolation between the subset of discrete data points; and storing, in the vector addressable memory, a result of evaluating the continuous function using the received data sample as the independent variable.

In Example 34, the subject matter of Example 33 wherein: the continuous function has two independent variables, the received data sample includes data corresponding to the two independent variables of the continuous function, and the vector processing means evaluates the continuous function using the received data sample as the two independent variables of the continuous function by performing a bi-linear interpolation between the subset of discrete data points.

In Example 35, the subject matter of any combination of Examples 33-34, wherein: the continuous function has three independent variables, the received data sample includes data corresponding to the three independent variables of the continuous function, and the vector processing means evaluates the continuous function using the received data sample as the three independent variables of the continuous function by performing a tri-linear interpolation between the subset of discrete data points.

In Example 36, the subject matter of any combination of Examples 33-35, wherein the received digital data stream is from among a plurality digital data streams, each one of the plurality of digital data streams being associated with a different frequency band, and wherein the continuous function represents a function used to obtain the digital pre-distortion (DPD) coefficients to be applied to the digital data stream prior to transmission via a power amplifier, the continuous function including a number of independent variables equal to the number of the different frequency bands.

In Example 37, the subject matter of any combination of Examples 33-36, wherein the processing means further includes a vector multiply accumulate unit (MAC) means for perform the linear interpolation between the subset of discrete data points using the received data sample as a hardware-executed operation in accordance with a hardware instruction.

In Example 38, the subject matter of any combination of Examples 33-37, wherein the processing means performs the linear interpolation between the subset of discrete data points using the received data sample as a software-executed operation over two or more instructional cycles.

In Example 39, the subject matter of any combination of Examples 33-38, wherein the processing means calculates addresses in the vector addressable memory storing the subset of discrete data points as a hardware-executed operation in accordance with a hardware instruction, the calculation of the addresses in the vector addressable memory being based upon an integer portion of the received data sample.

In Example 40, the subject matter of any combination of Examples 33-39, wherein the processing means calculates addresses in the vector addressable memory storing the subset of discrete data points as a software-executed operation over two or more instructional cycles, the calculation of the addresses in the vector addressable memory being based upon an integer portion of the received data sample.

Example 41 is a non-transitory computer-readable memory having instructions stored thereon that, when executed by one or more processor means of a vector processing engine, cause the vector processing engine to: access a vector addressable memory configured to store a set of discrete data points, with each one of the set of discrete data points representing a result of evaluating a continuous function using a respective discrete data sample as an independent variable of the continuous function; receive a data sample associated with a digital data stream, the data sample corresponding to the independent variable of the continuous function; retrieve, from among the set of discrete data points stored in the vector addressable memory, a subset of discrete data points corresponding to an evaluation of the continuous function for respective data samples; evaluate the continuous function using the received data sample as the independent variable of the continuous function by performing a linear interpolation between the subset of discrete data points; and store, in the vector addressable memory, a result of evaluating the continuous function using the received data sample as the independent variable.

In Example 42, the subject matter of Example 41, wherein: the continuous function has two independent variables, the received data sample includes data corresponding to the two independent variables of the continuous function, and the instructions, when executed by one or more processor means of the vector processing engine, further cause the vector processing engine to evaluate the continuous function using the received data sample as the two independent variables of the continuous function by performing a bi-linear interpolation between the subset of discrete data points.

In Example 43, the subject matter of any combination of Examples 41-42, wherein: the continuous function has three independent variables, the received data sample includes data corresponding to the three independent variables of the continuous function, and the instructions, when executed by one or more processor means of the vector processing engine, further cause the vector processing engine to evaluate the continuous function using the received data sample as the three independent variables of the continuous function by performing a tri-linear interpolation between the subset of discrete data points.

In Example 44, the subject matter of any combination of Examples 41-43, wherein the received digital data stream is from among a plurality digital data streams, each one of the plurality of digital data streams being associated with a different frequency band, and wherein the continuous function represents a function used to obtain digital pre-distortion (DPD) coefficients to be applied to the digital data stream prior to transmission via a power amplifier, the continuous function including a number of independent variables equal to the number of the different frequency bands.

In Example 45, the subject matter of any combination of Examples 41-44, wherein the instructions, when executed by one or more processor means of the vector processing engine, further cause the vector processing engine to perform the linear interpolation between the subset of discrete data points using the received data sample as a hardware-executed operation in accordance with a hardware instruction.

In Example 46, the subject matter of any combination of Examples 41-45, wherein the instructions, when executed by one or more processor means of the vector processing engine, further cause the vector processing engine to perform the linear interpolation between the subset of discrete data points using the received data sample as a software-executed operation over two or more instructional cycles.

In Example 47, the subject matter of any combination of Examples 41-46 wherein the instructions, when executed by one or more processor means of the vector processing engine, further cause the vector processing engine to calculate addresses in the vector addressable memory storing the subset of discrete data points as a hardware-executed operation in accordance with a hardware instruction, the calculation of the addresses in the vector addressable memory being based upon an integer portion of the received data sample.

In Example 48, the subject matter of any combination of Examples 41-47, wherein the instructions, when executed by one or more processor means of the vector processing engine, further cause the vector processing engine to calculate addresses in the vector addressable memory storing the subset of discrete data points as a software-executed operation over two or more instructional cycles, the calculation of the addresses in the vector addressable memory being based upon an integer portion of the received data sample.

An apparatus as shown and described.

A method as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processing circuitry" or "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

What is claimed is:

1. A vector processor, comprising:
a vector addressable memory configured to store a set of discrete data points, with each one of the set of discrete data points representing a result of evaluating a continuous function using a respective discrete data sample as an independent variable of the continuous function;
a data interface configured to receive a data sample associated with a digital data stream from among a plurality of digital data streams, each one of the plurality of digital data streams being associated with a respective frequency band,
wherein the data sample responding corresponds to the independent variable of the continuous function, and
wherein the continuous function represents a function used to obtain digital pre-distortion (DPD) coefficients to be applied to each one of the plurality of digital data streams, per frequency band, prior to transmission; and
processing circuitry configured to:
retrieve, from among the set of discrete data points stored in the vector addressable memory, a subset of discrete data points corresponding to an evaluation of the continuous function for respective data samples;
evaluate the continuous function using the received data sample as the independent variable of the continuous function by performing a linear interpolation between the subset of discrete data points; and
store, in the vector addressable memory, a result of evaluating the continuous function using the received data sample as the independent variable.

2. The vector processor of claim 1, wherein:
the continuous function has two independent variables,
the received data sample includes data corresponding to the two independent variables of the continuous function, and
the processing circuitry is configured to evaluate the continuous function using the received data sample as the two independent variables of the continuous function by performing a bi-linear interpolation between the subset of discrete data points.

3. The vector processor of claim 1, wherein:
the continuous function has three independent variables,
the received data sample includes data corresponding to the three independent variables of the continuous function, and
the processing circuitry is configured to evaluate the continuous function using the received data sample as the three independent variables of the continuous function by performing a tri-linear interpolation between the subset of discrete data points.

4. The vector processor of claim 1,
wherein the continuous function represents a function used to obtain the DPD coefficients to be applied to each one of the plurality of digital data streams prior to transmission via a power amplifier, and
wherein the continuous function includes a number of independent variables equal to the number of the respective frequency bands.

5. The vector processor of claim 1, wherein the processing circuitry further includes a vector multiply accumulate unit (MAC) configured to perform the linear interpolation between the subset of discrete data points using the received data sample as a hardware-executed operation in accordance with a hardware instruction.

6. The vector processor of claim 1, wherein the processing circuitry is configured to perform the linear interpolation between the subset of discrete data points using the received data sample as a software-executed operation over two or more instructional cycles.

7. The vector processor of claim 1, wherein the processing circuitry is configured to calculate addresses in the vector addressable memory storing the subset of discrete data points as a hardware-executed operation in accordance with a hardware instruction, the calculation of the addresses in the vector addressable memory being based upon an integer portion of the received data sample.

8. The vector processor of claim 1, wherein the processing circuitry is configured to calculate addresses in the vector addressable memory storing the subset of discrete data points as a software-executed operation over two or more instructional cycles, the calculation of the addresses in the vector addressable memory being based upon an integer portion of the received data sample.

9. A device, comprising:
a vector addressable memory configured to store a set of discrete data points, with each one of the set of discrete data points representing a result of evaluating a continuous function using a respective discrete data sample as an independent variable of the continuous function;
a data interface configured to receive a data sample associated with a digital data stream from among a plurality of digital data streams, each one of the plurality of digital data streams being associated with a respective frequency band,
wherein the data sample corresponds to the independent variable of the continuous function, and
wherein the continuous function represents a function used to obtain digital pre-distortion (DPD) coefficients to be applied to each one of the plurality of digital data streams, per frequency band, prior to transmission; and
a vector processing engine configured to:
retrieve, from among the set of discrete data points stored in the vector addressable memory, a subset of discrete data points corresponding to an evaluation of the continuous function for respective data samples;
evaluate the continuous function using the received data sample as the independent variable of the continuous function by performing a linear interpolation between the subset of discrete data points; and
store, in the vector addressable memory, a result of evaluating the continuous function using the received data sample as the independent variable.

10. The device of claim 9, wherein:
the continuous function has two independent variables,
the received data sample includes data corresponding to the two independent variables of the continuous function, and
the vector processing engine is configured to evaluate the continuous function using the received data sample as the two independent variables of the continuous function by performing a bi-linear interpolation between the subset of discrete data points.

11. The device of claim 9, wherein:
the continuous function has three independent variables,
the received data sample includes data corresponding to the three independent variables of the continuous function, and
the vector processing engine is configured to evaluate the continuous function using the received data sample as the three independent variables of the continuous function by performing a tri-linear interpolation between the subset of discrete data points.

12. The device of claim 9,
wherein the continuous function represents a function used to obtain the DPD coefficients to be applied to each one of the plurality of digital data streams prior to transmission via a power amplifier, and
wherein the continuous function includes a number of independent variables equal to the number of the respective frequency bands.

13. The device of claim 9, wherein the vector processing engine further includes a vector multiply accumulate unit (MAC) configured to perform the linear interpolation between the subset of discrete data points using the received data sample as a hardware-executed operation in accordance with a hardware instruction.

14. The device of claim 9, wherein the vector processing engine is configured to perform the linear interpolation between the subset of discrete data points using the received data sample as a software-executed operation over two or more instructional cycles.

15. The device of claim 9, wherein the vector processing engine is configured to calculate addresses in the vector addressable memory storing the subset of discrete data points as a hardware-executed operation in accordance with a hardware instruction, the calculation of the addresses in the vector addressable memory being based upon an integer portion of the received data sample.

16. The device of claim 9, wherein the vector processing engine is configured to calculate addresses in the vector addressable memory storing the subset of discrete data points as a software-executed operation over two or more instructional cycles, the calculation of the addresses in the vector addressable memory being based upon an integer portion of the received data sample.

17. A non-transitory computer-readable memory having instructions stored thereon that, when executed by one or more processors of a vector processing engine, cause the vector processing engine to:
access a vector addressable memory configured to store a set of discrete data points, with each one of the set of discrete data points representing a result of evaluating a continuous function using a respective discrete data sample as an independent variable of the continuous function;
receive a data sample associated with a digital data stream from among a plurality of digital data streams, each one of the plurality of digital data streams being associated with a respective frequency band,
wherein the data sample corresponds to the independent variable of the continuous function, and
wherein the continuous function represents a function used to obtain digital pre-distortion (DPD) coefficients to be applied to each one of the plurality of digital data streams, per frequency band, prior to transmission;
retrieve, from among the set of discrete data points stored in the vector addressable memory, a subset of discrete data points corresponding to an evaluation of the continuous function for respective data samples;
evaluate the continuous function using the received data sample as the independent variable of the continuous function by performing a linear interpolation between the subset of discrete data points; and
store, in the vector addressable memory, a result of evaluating the continuous function using the received data sample as the independent variable.

18. The non-transitory computer-readable memory of claim 17, wherein:
the continuous function has two independent variables,
the received data sample includes data corresponding to the two independent variables of the continuous function, and
the instructions, when executed by one or more processors of the vector processing engine, further cause the vector processing engine to evaluate the continuous function using the received data sample as the two independent variables of the continuous function by performing a bi-linear interpolation between the subset of discrete data points.

19. The non-transitory computer-readable memory of claim 17, wherein:
the continuous function has three independent variables,
the received data sample includes data corresponding to the three independent variables of the continuous function, and
the instructions, when executed by one or more processors of the vector processing engine, further cause the vector processing engine to evaluate the continuous function using the received data sample as the three independent variables of the continuous function by performing a tri-linear interpolation between the subset of discrete data points.

20. The non-transitory computer-readable memory of claim 17,
wherein the continuous function represents a function used to obtain the DPD coefficients to be applied to each one of the plurality of digital data streams prior to transmission via a power amplifier,
wherein the continuous function includes a number of independent variables equal to the number of the different frequency bands.

21. The non-transitory computer-readable memory of claim 17, wherein the instructions, when executed by one or more processors of the vector processing engine, further cause the vector processing engine to perform the linear interpolation between the subset of discrete data points using the received data sample as a hardware-executed operation in accordance with a hardware instruction.

22. The non-transitory computer-readable memory of claim 17, wherein the instructions, when executed by one or more processors of the vector processing engine, further cause the vector processing engine to perform the linear interpolation between the subset of discrete data points using the received data sample as a software-executed operation over two or more instructional cycles.

23. The non-transitory computer-readable memory of claim 17, wherein the instructions, when executed by one or more processors of the vector processing engine, further cause the vector processing engine to calculate addresses in the vector addressable memory storing the subset of discrete data points as a hardware-executed operation in accordance with a hardware instruction, the calculation of the addresses in the vector addressable memory being based upon an integer portion of the received data sample.

24. The non-transitory computer-readable memory of claim 17, wherein the instructions, when executed by one or more processors of the vector processing engine, further cause the vector processing engine to calculate addresses in the vector addressable memory storing the subset of discrete data points as a software-executed operation over two or more instructional cycles, the calculation of the addresses in the vector addressable memory being based upon an integer portion of the received data sample.

* * * * *